United States Patent
Yoshizawa

(10) Patent No.: US 7,229,695 B2
(45) Date of Patent: Jun. 12, 2007

(54) ANTIREFLECTIVE LAYER, ANTIREFLECTIVE FILM AND IMAGE DISPLAY UNIT

(75) Inventor: Masataka Yoshizawa, Minami-Ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 165 days.

(21) Appl. No.: 11/062,689

(22) Filed: Feb. 23, 2005

(65) Prior Publication Data

US 2005/0187333 A1    Aug. 25, 2005

(30) Foreign Application Priority Data

Feb. 23, 2004   (JP)   ............... 2004-046625

(51) Int. Cl.
*B32B 9/04* (2006.01)
*B32B 27/04* (2006.01)

(52) U.S. Cl. ............. 428/447; 428/421; 428/448; 525/104; 359/601

(58) Field of Classification Search .................. None
See application file for complete search history.

(56) References Cited

U.S. PATENT DOCUMENTS 6,908,647 B2 *  6/2005  Obayashi et al. .......... 428/1.32

FOREIGN PATENT DOCUMENTS

| JP | 11-228631 | | 8/1999 |
|----|-----------|---|--------|
| JP | 2003-26732 | | 1/2003 |
| JP | 2003-222702 A | * | 8/2003 |
| JP | 2003-294911 | * | 10/2003 |
| JP | 2004-4444 | | 1/2004 |

OTHER PUBLICATIONS

Machine-generated translation of JP 2003-222702.*
Machine-generated translation of JP 2003-026732.*

* cited by examiner

*Primary Examiner*—Marc S. Zimmer
(74) *Attorney, Agent, or Firm*—Buchanan Ingersoll & Rooney PC

(57) ABSTRACT

An antireflective layer comprising a plurality of functional layers having different refractive indexes, the plurality of functional layers including a lower fractive index layer containing a fluorine-containing copolymer, wherein the low refractive index layer further contains a polymer having a polymer graft part containing a polysiloxane segment represented by the following formula [1] in a side chain of the polymer:

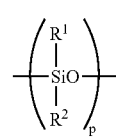

[1]

wherein $R^1$ and $R^2$ may be same or different and each represents a hydrogen atom, an alkyl group or an aryl group; and p is an integer of from 10 to 500.

6 Claims, 1 Drawing Sheet

ANTIREFLECTIVE LAYER, ANTIREFLECTIVE FILM AND IMAGE DISPLAY UNIT

FIELD OF THE INVENTION

This invention relates to an antireflective layer, an antireflective film and an imaged is play unit (in particular, a liquid display unit) using the same.

BACKGROUND OF THE INVENTION

An antireflective film is employed in general to lower the refractive index with the use of the optical interference principle so as to prevent a decrease in contrast or image transfer caused by the reflection of outside light in image display units such as a cathode-ray tube (CTR), a plasma display panel (PDP), an electro luminescence display (ELD) and a liquid crystal display (LCD).

Such an antireflective film can be constructed by forming a hard coat layer and an antiglare hard coat layer on a substrate and further forming a low refractive index layer having an appropriate layer thickness thereon. From the viewpoint of productivity, it is preferable to form each layer by the wet coating.

As materials usable in the wet coating, there have been known fluorine-containing copolymers having a low refractive index (see, for example, JP-A-2003-26732). However, these fluorine-containing copolymers suffer from a problem that uniform coating cannot be achieved thereby when applied on an antiglare hard coat layer having peaks and valleys.

On the other hand, it has been proposed to add a surfactant to a coating composition so as to lower repellency and so on and achieve uniform coating. This proposal is based on the mechanism that, by adding a surfactant to a coating, the surface tension is lowered and wetting properties on the subject to be coated so that a change in the surface tension in the course of the coating layer formation is lessened or lowered and heat convection is prevented, thereby improving the layer uniformity (*KOTINGUYO TENKAZAI NO SAISHIN GIJUTSU*, supervised by Haruo Kiryu, CMC, 2001).

JP-A-11-228631 and JP-A-2004-4444 report a copolymer having a polysiloxane block copolymer introduced thereinto with the use of a silicone macro azo initiator and use of the copolymer in an antireflective layer. According to this method, uniform face figure can be obtained even in a face having peaks and valleys. In the case where the amount of the silicone macro azo initiator is increased so as to elevate the polysiloxane content in producing the polysiloxane-containing copolymer, however, the initiator remaining or a component produced by radical coupling of the remaining initiator can be hardly eliminated. Accordingly, the amount of the polysiloxane component to be introduced cannot be always easily controlled.

As described above, it has been required to develop a technique whereby the coating properties of a fluorine-containing copolymer can be improved without damaging layer qualities by using an additive which allows the regulation of the amount of polysiloxane to be introduced.

SUMMARY OF THE INVENTION

The first object of the invention is to provide an antireflective layer which has a low refractive index, suffers from little scuffmarks and has a uniform face figure. The second object thereof is to provide an antireflective film being excellent in the above characteristics which has the antireflective layer located on a transparent substrate. The third object thereof is to provide an image display unit being excellent in the above characteristics.

The objects of the invention can be achieved by an antireflective layer having a low refractive index layer which contains a polymer graft part containing a polysiloxane segment in a side chain (hereinafter sometimes simply called a graft polymer).

Now, the means therefor will be illustrated as the following 1) to 7).

1) An antireflective layer comprising a plurality of functional layers having different refractive indexes, which contains a polymer having a polymer graft part containing a polysiloxane segment represented by the following formula [1] in a side chain in a low refractive index layer containing a fluorine-containing copolymer.

Formula [1]:

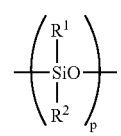

In the above formula [1], $R^1$ and $R^2$ may be the same or different and each represents a hydrogen atom, an alkyl group or an aryl group; and p is an integer of from 10 to 500.

2) An antireflective layer as described in the above 1), wherein the graft polymer is a graft polymer obtained by homopolymerizing or copolymerizing a polysiloxane-containing vinyl monomer represented by the following formula [2].

Formula [2]:

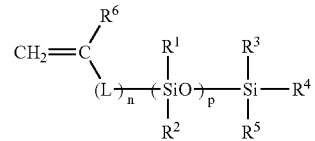

In the above formula [2], $R^1$, $R^2$ and p are each as defined in the formula [1]; $R^3$, $R^4$ and $R^5$ may be the same or different and each represents a hydrogen atom or a monovalent organic group; $R^6$ represents a hydrogen atom or a methyl group; L represents a single bond or a divalent linking group; and n is 0 or 1.

3) An antireflective layer as described in the above 2), wherein the polysiloxane-containing vinyl monomer represented by the above formula [2] is represented by the following formula [3].

Formula [3]:

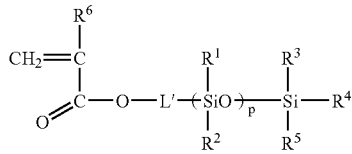

In the above formula [3], $R^1$, $R^2$, $R^3$, $R^4$, $R^5$, $R^6$ and p are each as defined in the formula [2]; and L' represents an alkylene group or an arylene group having from 1 to 25 carbon atoms.

4) An antireflective layer as described in any of the above 1) to 3) which is an antiglare/antireflective layer comprising a plurality of functional layers having different refractive indexes, wherein, in a low refractive index layer containing a fluorine-containing copolymer, a polymer having a polymer graft part containing a polysiloxane segment represented by any of the above formulae [1] to [3] contains a polymerization unit derived from a monomer represented by the following formula [4] as a polymer component.

Formula [4]:

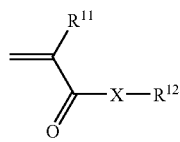

In the above formula [4], $R^{11}$ represents a hydrogen atom, a halogen atom or a methyl group; X represents an oxygen atom, a sulfur atom or —N($R^{13}$)—; $R^{12}$ represents a linear, branched or cyclic alkyl group having from 1 to 20 carbon atoms and optionally having a substituent; and $R^{13}$ represents a hydrogen atom or an alkyl group having from 1 to 8 carbon atoms.

5) An antiglare/antireflective layer comprising a plurality of functional layers having different refractive indexes which contains, in a low refractive index layer containing a fluorine-containing copolymer, a graft polymer represented by the following formula [5].

Formula [5]:

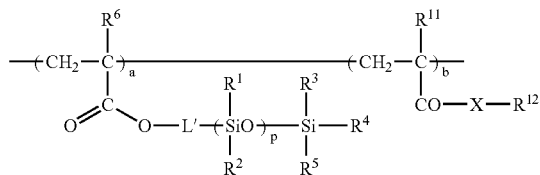

In the above formula [5], $R^1$, $R^2$, $R^3$, $R^4$, $R^5$, $R^6$, p and L' are each as defined in the formula [3]; $R^{11}$, $R^{12}$ and X are each as defined in the formula [4]; and a and b represent the mass (weight) fractions (%) of the respective components, provided that $0.01 \leq a \leq 100$ and $0 \leq b \leq 95$.

6) An antireflective film having an antireflective layer as described in any of the above 1) to 5) on a transparent substrate.

7) An image display unit having an antireflective film as described in the above 6).

According to the invention, it is possible to stably produce an antireflective layer capable of achieving both of a high face figure uniformity and favorable scratch resistance. By using the antireflective layer according to the invention, moreover, it is possible to provide a polarizing plate and an image display unit showing sufficient antireflective performance and excellent visibility.

Figure 1:
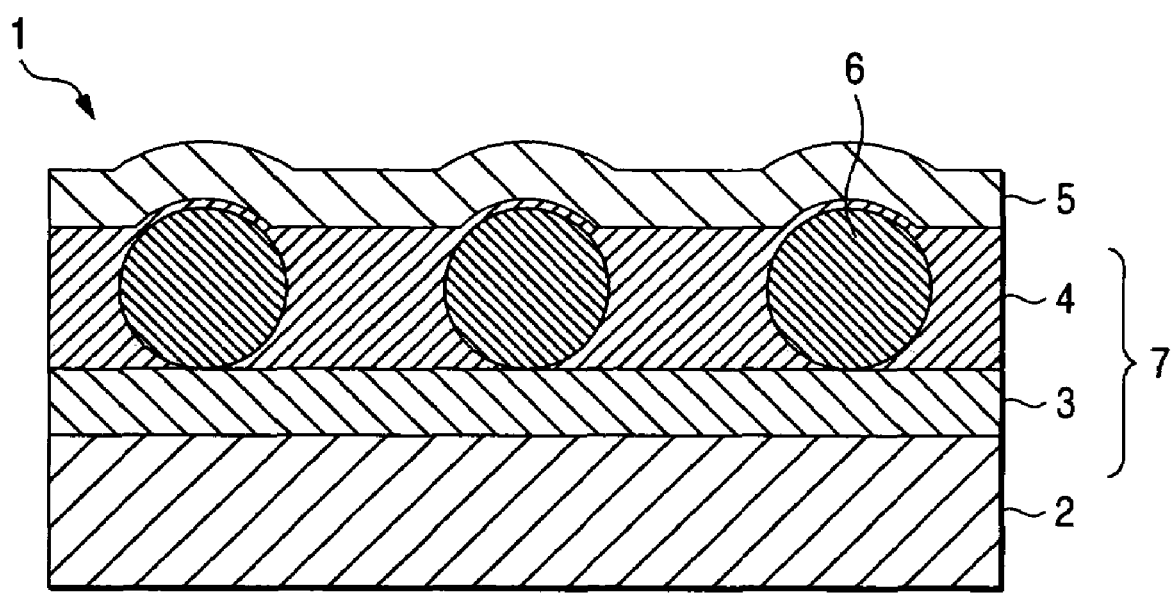
FIG. 1 is a schematic sectional view showing the layer construction of an antiglare antireflective layer.

DESCRIPTION OF THE REFERENCE NUMERALS AND SIGNS 1 antiglare/antireflective film
2 transparent substrate
3 hard coat layer
4 antiglare hard coat layer
5 low refractive index layer
6 matting particles
7 antireflective layer

DETAILED DESCRIPTION OF THE INVENTION

Now, the fundamental constitution of the antireflective layer according to the invention will be illustrated by referring to the drawing.

FIG. 1 is a schematic sectional view showing an example of the antireflective layer and antireflective film according to the invention. In this case, an antiglare/antireflective film 1 has an antireflective layer 7 which comprises a plurality of functional layers having different refractive indexes (i.e., a hard coat layer 3, an antiglare hard coat layer 4 and a low refractive index layer 5 having the lowest refractive index) laminated in this order on a transparent substrate 2. The antiglare hard coat layer 4 contains fine particles 6 dispersed therein. The refractive index of the material of the antiglare hard coat layer other than the fine particles 6 preferably ranges from 1.48 to 2.00, while the refractive index of the low refractive index layer 5 preferably ranges from 1.38 to 1.49. In the invention, the hard coat layer may be composed of either a single layer or a plurality of layers, for example, two to four layers. Thus, it is preferable that the hard coat layer 3 as shown in FIG. 1 is formed so as to impart film strength, though it is not essentially required. Similarly, the low refractive index layer may be composed of either a single layer or two or more layers. The expression "from (numerical value 1) to (numerical value 2)" as used herein means "at least (numerical value 1) but not more than (numerical value 2)".

The antireflective layer to be used in the invention has peaks and valleys on the surface in the side of having the low refractive index layer, thereby imparting antiglare properties.

The antiglare properties correlate to the average surface roughness (Ra) of the surface. With respect to peaks and valleys on the surface, it is preferable that, when a 1 mm² section is taken out at random from a 100 cm² area, the average surface roughness (Ra) per mm² is from 0.01 to 0.4 µm, still preferably from 0.03 to 0.3 µm, still preferably from 0.05 to 0.25 µm and particularly preferably from 0.07 to 0.2 µm.

The average surface roughness (Ra) is described in Techno Compact Series (6) (*HYOMEN ARASA NO SOKUTEI HYOKAHO*, Jiro Nara, Sogo Gijutsu Senta).

The peak/valley shape on the surface of the antireflective layer to be used in the invention can be evaluated by observing under an atomic force microscope (AFM).

The peaks and valleys on the surface can be formed by a publicly known method. It is preferable in the invention to employ a method which comprises pressing a plate having a peak/valley structure against the film surface under elevated pressure and thus forming peaks and valleys (for example, embossing), or a method which comprises adding particles to any of the layers on the antireflective layer to form an antiglare layer and then forming peaks and valleys on the antireflective layer surface.

To form peaks and valleys on the surface by embossing, use may be made of publicly known methods. It is particularly favorable to form peaks and valleys by the method described in JP-A-2000-329905.

To ensure a high face uniformity, the low refractive index layer according to the invention contains a graft polymer having a polysiloxane segment in a side chain. Due to the addition of the polymer, it becomes possible to provide an antireflective layer having an improved facial uniformity and a low refractive index and being highly resistant to scratch.

Next, the low refractive index layer according to the invention will be described.

The refractive index of the low refractive index layer in the antireflective layer according to the invention preferably ranges from 1.38 to 1.49, still preferably from 1.38 to 1.44.

From the viewpoint of achieving a low refractive index, it is preferable that the low refractive index layer satisfies the following numerical formula (I).

$$(m\lambda/4) \times 0.7 < n_1 d_1 < (m\lambda/4) \times 1.3 \quad \text{Numerical formula (I):}$$

In the above formula, m is a positive odd number; $n_1$ is the refractive index of the low refractive index layer; $d_1$ is the layer thickness (nm) of the low refractive index layer; and $\lambda$ is wavelength ranging from 500 to 550 nm.

The expression "satisfy the above numerical formula (I)" means that there is the numerical value m (a positive odd number, usually being 1) satisfying the above numerical formula (I) within the wavelength range as defined above.

Next, a material for forming the low refractive index layer according to the invention will be discussed.

The low refractive index layer according to the invention contains a fluorine-containing copolymer as a low-refractive index binder. As this fluorine-containing copolymer, use is made of a fluorine-containing copolymer which has a coefficient of dynamic friction of from 0.03 to 0.15 and a contact angle to water of from 90 to 120° and undergoes crosslinking due to heating or ionizing radiation. The low refractive index layer according to the invention may also contain an inorganic filler to elevate the layer strength.

Examples of the fluorine-containing copolymer to be used in the low refractive index layer as described above include hydrolysis/dehydrated condensation products of perfluoroalkyl group-containing silane compounds (for example, (heptadecafluoro-1,1,2,2-tetrahydrodecyl)triethoxysilane) and fluorine-containing copolymers comprising a fluorine-containing monomer polymerization unit and another polymerization unit for imparting crosslinking reactivity.

Specific examples of the fluorine-containing copolymer include fluoroolefins (for example, fluoroethylene, vinylidene fluoride, tetrafluoroethylene, hexafluoropropylene and perfluoro-2,2-dimethyl-1,3-dioxol), partly or completely fluorinated alkyl ester derivatives of (meth)acrylic acid (for example, BISCOAT 6FM® manufactured by OSAKA YUKI CHEMICAL Co., Ltd. and M-2020® manufactured by DAIKIN INDUSTRIES, LTD.) and completely or partly fluorinated vinyl ethers. Perfluoroolefines are preferred and hexafluoropropylene is particularly preferred from the viewpoints of refractive index, solubility, transparency, availability and so on.

Examples of the polymerization unit for imparting crosslinking reactivity include polymerization units obtained by polymerizing a monomer preliminarily having a self-crosslinkable functional group in its molecule such as glycidyl (meth)acrylate and glycidyl vinyl ether; polymerization units obtained by polymerizing a monomer having a carboxyl group, a hydroxy group, an amino group, a sulfo group or the like (for example, (meth)acrylic acid, methylol (meth)acrylate, hydroxyalkyl(meth)acrylate, allyl acrylate, hydroxyethyl vinyl ether, hydroxybutyl vinyl ether, maleic acid and crotonic acid); and polymerization units obtained by introducing a crosslinking reactive group such as (meth) acryloyl group to these polymerization units by a polymer reaction (for example, acrylic acid chloride is treated with a hydroxy group to thereby introduce the same). The term "(meth)acrylate" or the like to be used herein means "acrylate or methacrylate".

By considering the solubility in a solvent, transparency of a coating layer and soon, it is also possible to employ a fluorine-free monomer polymerization unit as a copolymer component, in addition to the fluorine-containing monomer polymerization unit and the polymerization unit for imparting crosslinking reactivity as discussed above. Such a monomer usable together is not particularly restricted. Namely, examples thereof include olefins (for example, ethylene, propylene, isoprene, vinyl chloride and vinylidene chloride), acrylic acid esters (for example, methyl acrylate, ethyl acrylate and 2-ethylhexyl acrylate), methacrylic acid esters (for example, methyl methacrylate, ethyl methacrylate, butyl methacrylate and ethylene glycol dimethacrylate), styrene derivatives (for example, styrene, divinylbenzene, vinyltoluene and α-methylstyrene), vinyl ethers (for example, methyl vinyl ether, ethyl vinyl ether and cyclohexyl vinyl ether), vinyl esters (for example, vinyl acetate, vinyl propionate and vinyl cinnamate), acrylamides (for example, N-tert-butylacrylamide and N-cyclohexylacrylamide), methacrylamides and acrylonitrile derivatives.

In the above polymers, use may be made of appropriate hardening agents as described in JP-A-10-25388 and JP-A-10-147739.

A particularly useful fluorine-containing copolymer in the invention is a random copolymer of a perfluoroolefin with a vinyl ether or a vinyl ester. In particular, a fluorine-containing copolymer having a group crosslinkable alone (for example, radical-reactive groups such as (meth)acryloyl group, and ring-opening polymerizable group such as epoxy group and oxetanyl group) is preferred. The content of the crosslinking reactive group-containing polymerization unit preferably amounts to 5 to 70% by mol, still preferably 30 to 60% by mol, of the total polymerization units.

Next, the graft polymer having the polysiloxane segment represented by the formula [1] in a side chain will be illustrated.

Although the graft polymer having the polysiloxane segment represented by the formula [1] in a side chain is not particularly restricted in the main chain structure, it preferably has a structure obtained by polymerizing an ethylenically unsaturated group. The polysiloxane segment may be bonded to the main chain either directly or via an appropriate linking group.

In the formula [1], $R^1$ and $R^2$ represent each a hydrogen atom, an alkyl group or an aryl group optionally having a substituent. $R^1$ and $R^2$ may be either the same or different. As the alkyl group, those having from 1 to 4 carbon atoms are preferable and examples thereof include methyl, trifluoromethyl and ethyl groups. As the aryl group, those having from 6 to 20 carbon atoms are preferable and examples thereof include phenyl and naphthyl groups. Among all, methyl and phenyl groups are preferred and methyl group is particularly preferred. Examples of the substituent optionally occurring in $R^1$ and $R^2$ include alkyl groups having from 1 to 6 carbon atoms (for example, methyl and ethyl), aryl groups having from 6 to 10 carbon atoms (for example, phenyl), alkoxy groups having from 1 to 6 carbon atoms (for example, methoxy and ethoxy), alkoxycarbonyl groups having from 1 to 6 carbon atoms (for example, methoxycarbonyl) a cyano group, a fluorine atom and a chlorine atom.

p is an integer of from 10 to 500, preferably form 50 to 300 and particularly preferably from 100 to 250.

The polymer having the polysiloxane structure represented by the formula [1] in a side chain is synthesized by, for example, a method which comprises introducing a polysiloxane having a corresponding reactive group (for example, amino, mercapto, carboxy or hydroxyl group to epoxy or acid anhydride group) at one end into a polymer having a reactive group such as epoxy, hydroxy, carboxy or acid anhydride group) via a polymer reaction as reported in J. Appl. Polym. Sci. 2000, 78, 1955 and JP-A-56-28219, or a method which comprises polymerizing a polysiloxane-containing silicone macromer. In the invention, the method of introducing a silicone macromer is particularly preferable.

Although the silicone macromer is not particularly restricted in its polymerizable group, a structure represented by the formula [2] is preferable. In the formula [2], $R^1$, $R^2$ and p are each as defined in the formula [1]. $R^3$ to $R^5$ each represents a substituted or unsubstituted monovalent organic group or a hydrogen atom, preferably an alkyl group having from 1 to 10 carbon atoms (for example, methyl, ethyl or octyl group), an alkoxy group having from 1 to 10 carbon atoms (for example, methoxy, ethoxy or propyloxy group) or an aryl group having from 6 to 20 carbon atoms (for example, phenyl or naphthyl group), still preferably a phenyl group or an alkyl group having from 1 to 5 carbon atoms and particularly preferably a methyl group. $R^3$ to $R^5$ may be the same or different. Examples of the substituent optionally occurring in $R^3$ to $R^5$ are the same as those cited as the substituents of $R^1$ and $R^2$. $R^6$ represents a hydrogen atom or a methyl group. L represents a single bond or a divalent linking group, preferably having from 1 to 25 carbon atoms. Although L is not particularly restricted so long as being capable of linking polymerizable vinyl group, one having a structure represented by the following formula [6] or the formula [7] is still preferable. n is 0 or 1.

Compounds represented by the formula [2] can be synthesized by, for example, the method described in JP-A-6-322053.

Formula [6]:

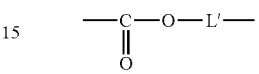

Formula [7]:

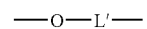

In the above formula [6] or the formula [7], L' represents a substituted or unsubstituted, linear, branched or alicyclic alkylene group or a substituted or unsubstituted arylene group, preferably an alkylene group or an arylene group having from 1 to 25 carbon atoms, still preferably an unsubstituted linear alkylene group having form 1 to 25 carbon atoms, and particularly preferably an ethylene group or a propylene group. As the substituent in L', those cited above as the substituent of $R^1$ and $R^2$ are preferable.

Among these silicone macromers, those represented by the formula [3] are particularly preferred. In the formula [3], $R^1$ to $R^6$ and p are each as defined in the formula [2], while L' is as defined in the formulae [6] and [7].

Next, preferable examples of the polymerization unit (repeating unit) having a polysiloxane part in a side chain useful in the invention will be presented, though the invention is not restricted thereto.

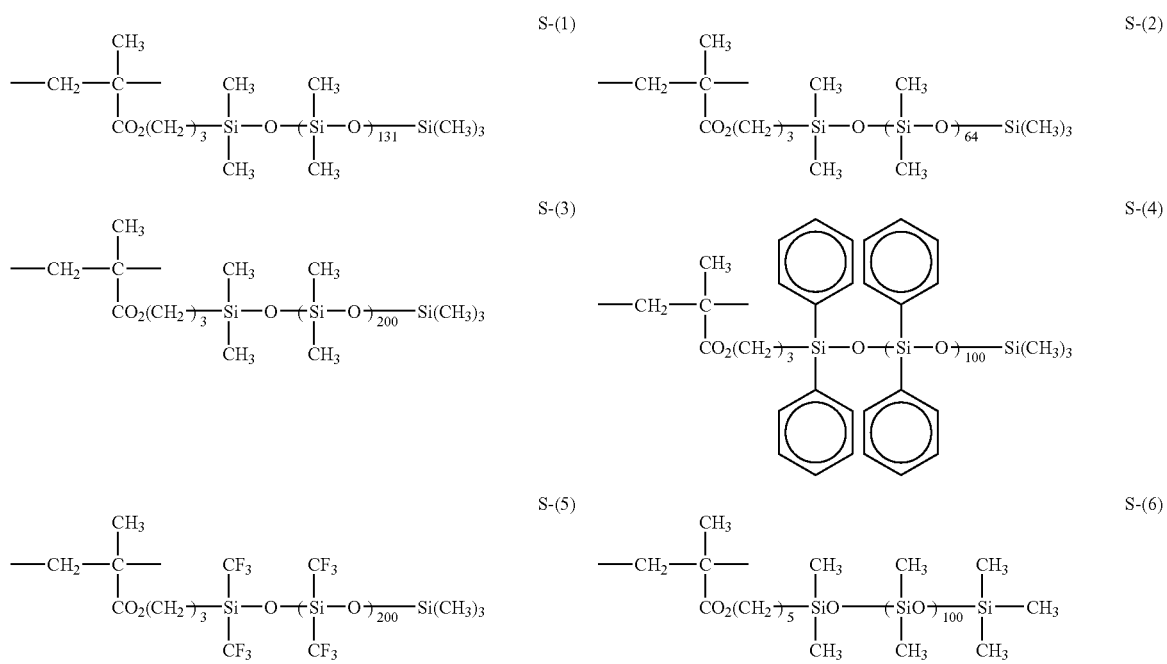

-continued
S-(7)
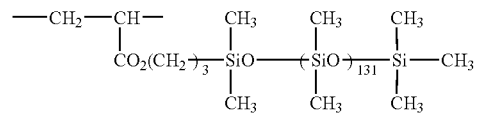
S-(8)
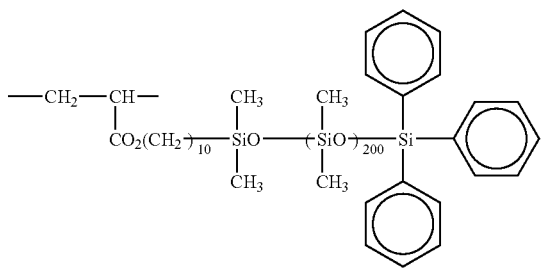
S-(9)
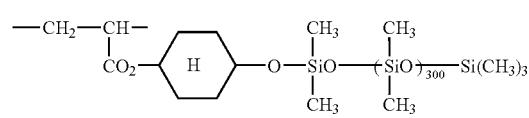
S-(10)
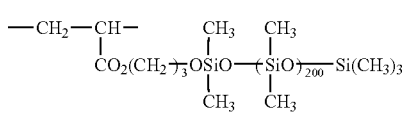
S-(11)
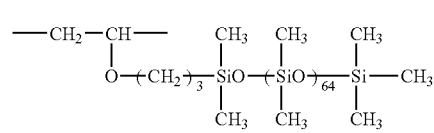
S-(12)
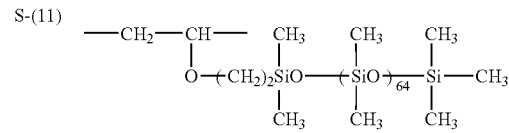
S-(13)
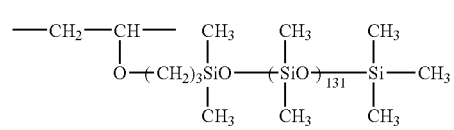
S-(14)
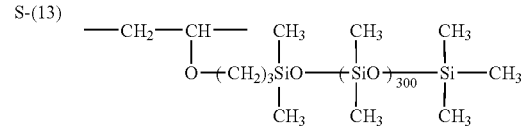
S-(15)
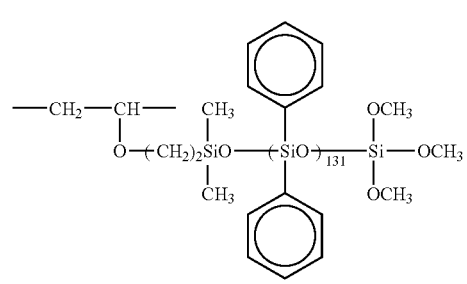
S-(16)
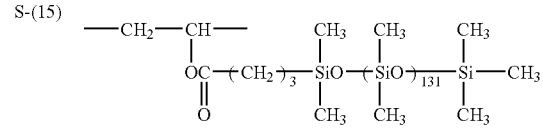
S-(17)
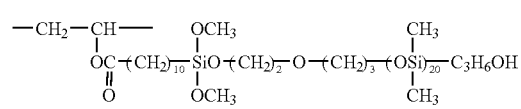
S-(18)
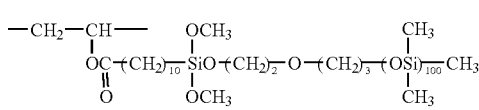
S-(19)
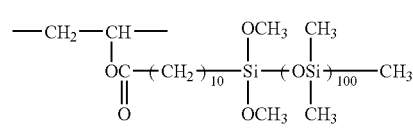
S-(20)
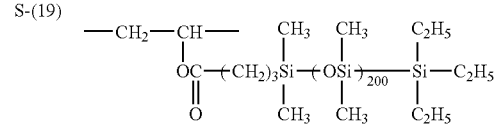
S-(21)
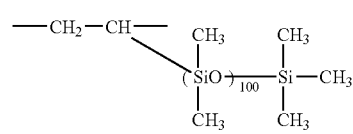
S-(22)
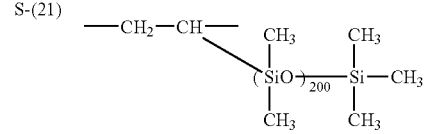
S-(23)
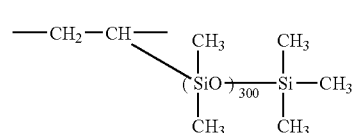
S-(24)
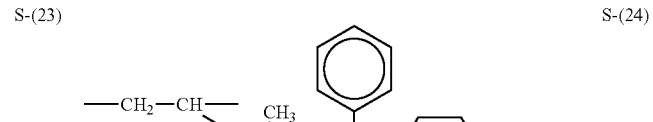
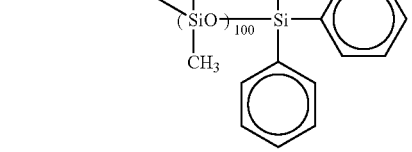

-continued

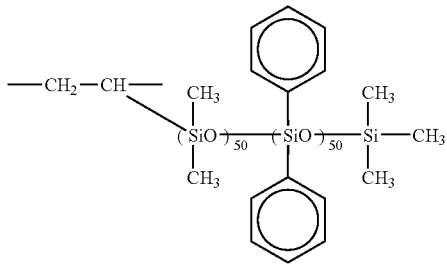
S-(25)

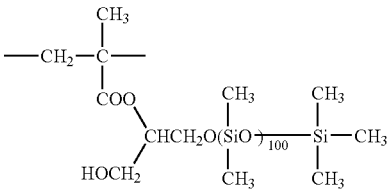
S-(26)

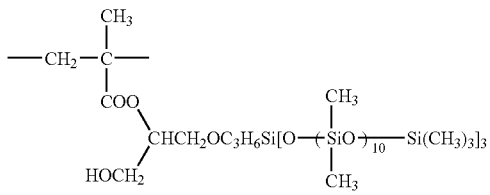
S-(27)

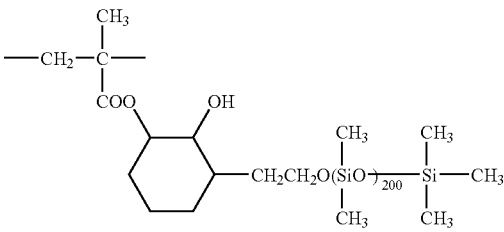
S-(28)

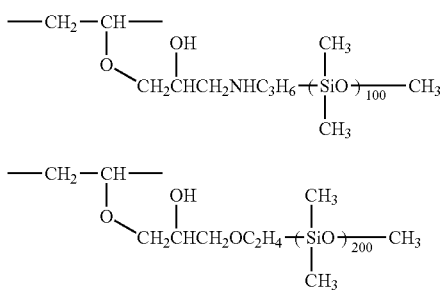
S-(29)

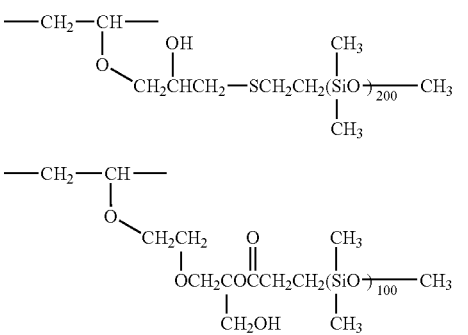
S-(30)

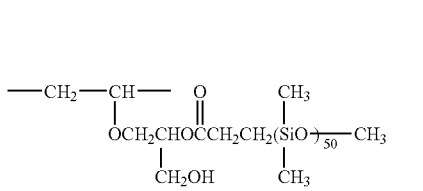
S-(31)

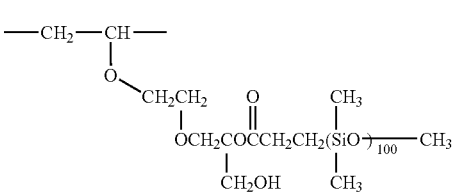
S-(32)

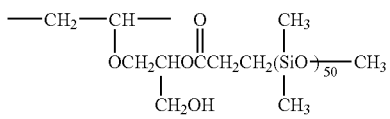
S-(33)

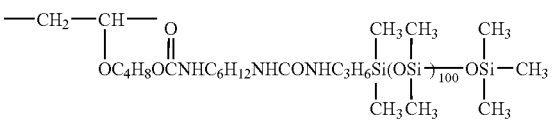
S-(34)

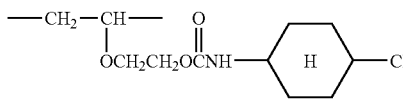
S-(35)

From the viewpoint of the compatibility with the fluorine-containing copolymer, it is preferable that the graft polymer according to the invention is a copolymer of a monomer represented by the formula [2] or [3] with a copolymerizable monomer of another type. As such a copolymerizable monomer of another type, use can be made of those described in *Polymer Handbook* 2nd ed., J. Brandrup, Wiley Interscience (1975), chapter 2, pages 1-483.

Examples thereof include compounds having an addition-polymerizable unsaturated bond selected from among acrylic acid, methacrylicacid, acrylicacidesters, methacrylicacidesters, acrylamides, methacrylamides, allyl compounds, vinyl ethers and vinyl esters.

More specifically speaking, the following monomers may be cited.

Acrylic Acid Esters:

Methyl acrylate, ethyl acrylate, propyl acrylate, chloroethyl acrylate, 2-hydroxyethyl acrylate, trimethylolpropanemonoacrylate, benzyl acrylate, methoxybenzyl acrylate, furfuryl acrylate, tetrahydrofurfuryl acrylate and so on.

Methacrylic Acid Esters:

Methylmethacrylate, ethyl methacrylate, propylmethacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate and so on.

Acrylamides:

Acrylamide, N-alkylacrylamides (wherein the alkyl group is one having from 1 to 3 carbon atoms such as methyl, ethyl or propyl group), N,N-dialkylacrylamides (wherein the alkyl group is one having from 1 to 6 carbon atoms), N-hydroxyethyl-N-methylacrylamide, N-2-acetoxyamidoethyl-N-acetylacrylamide and so on.

Methacrylamides:

Methacrylamide, N-alkylmethacrylamides (wherein the alkyl group is one having from 1 to 3 carbon atoms such as methyl, ethyl or propyl group), N,N-dialkylmethacrylamides (wherein the alkyl group is one having from 1 to 6 carbon atoms), N-hydroxyethyl-N-methylmethacrylamide, N-2-acetoxyamidoethyl-N-acetylmethacrylamide and so on.

Allyl Compounds:

Allyl esters (for example, allyl acetate, allyl caproate, allyl caprylate, allyl laurate, allyl palmitate, allyl stearate, allyl benzoate, allyl acetoacetate and allyl lactate), allyloxyethanol and so on.

Vinyl Ethers:

Alkyl vinyl ethers (for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether and so on.

Vinyl Esters:

Vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenyl butyrate, vinyl cyclohexylcarboxylate and so on.

Dialkyl Itaconates:

Dimethyl itaconate, diethyl itaconate, dibutyl itaconate and so on.

Dialkyl Esters or Monoalkyl Esters of Fumaric Acid:

Dibutyl fumarate and so on.

Others:

Crotonic acid, itaconic acid, acrylonitrile, methacrylonitrile, maleilonitrile, styrene and so on.

Among these monomers, those represented by the formula [4] are preferable. In the formula [4], $R^{11}$ represents a hydrogen atom, a halogen atom or a methyl group and a hydrogen atom or a methyl group is preferred. X represents an oxygen atom, a sulfur atom or —$N(R^{13})$—, an oxygen atom or —$N(R^{13})$— is preferred and an oxygen atom is still preferred. $R^{13}$ represents a hydrogen atom or an alkyl group having from 1 to 8 carbon atoms, a hydrogen atom or an alkyl group having from 1 to 4 carbon atoms is preferred and a hydrogen atom or a methyl group is still preferred. $R^{12}$ represents a linear, branched or cyclic alkyl group optionally having a substituent or an aromatic group optionally having a substituent (for example, a phenyl group or a naphthyl group). A linear, branched or cyclic alkyl group having from 1 to 18 carbon atoms or an aromatic group having from 6 to 18 carbon atoms in total is preferred, and a linear, branched or cyclic alkyl group having from 1 to 8 carbon atoms is still preferred.

Next, examples of the monomer represented by the formula [4] will be presented, though the invention is not restricted thereto.

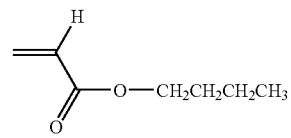

A-1

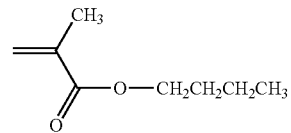

A-2

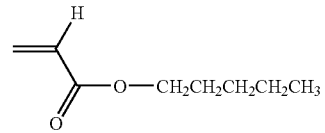

A-3

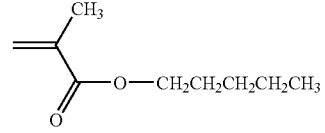

A-4

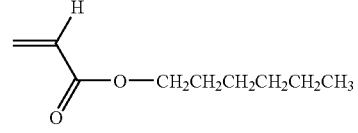

A-5

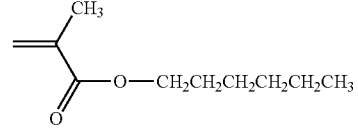

A-6

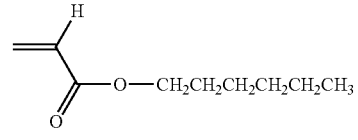

A-7

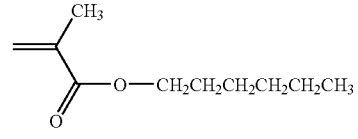

A-8

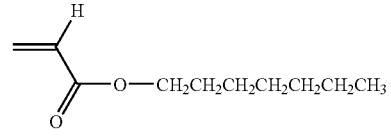

A-9

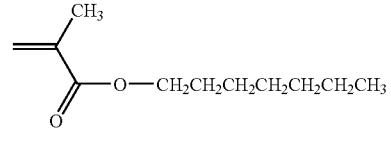

A-10

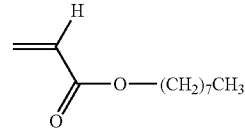

A-11

-continued
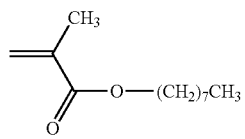  A-12
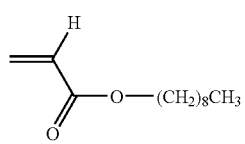  A-13
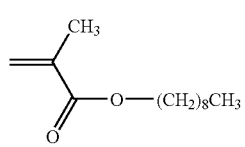  A-14
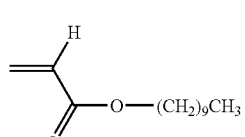  A-15
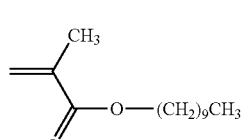  A-16
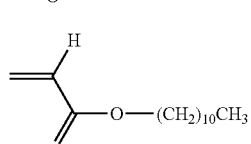  A-17
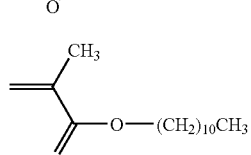  A-18
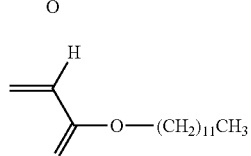  A-19
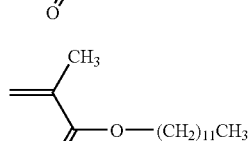  A-20
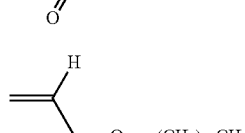  A-21
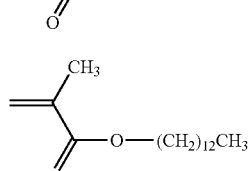  A-22
-continued
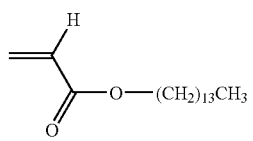  A-23
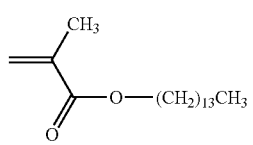  A-24
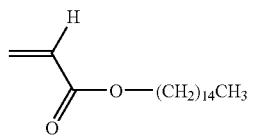  A-25
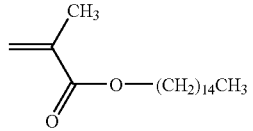  A-26
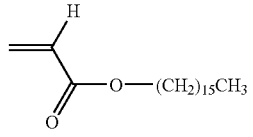  A-27
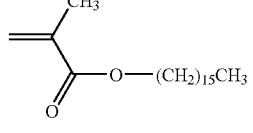  A-28
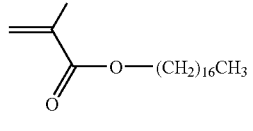  A-29
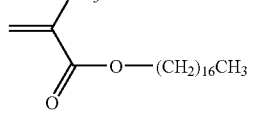  A-30
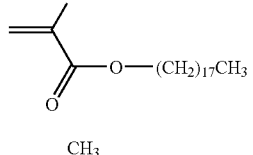  A-31
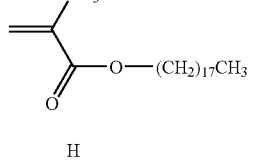  A-32
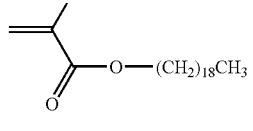  A-33

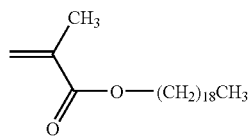 A-24
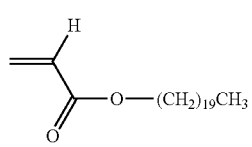 A-25
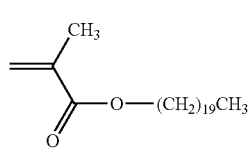 A-26
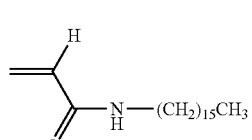 A-27
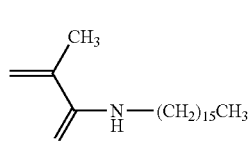 A-28
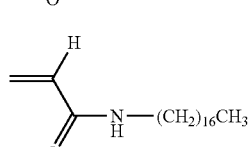 A-29
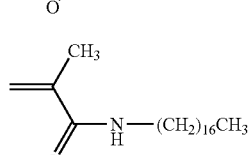 A-30
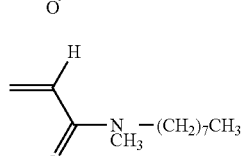 A-31
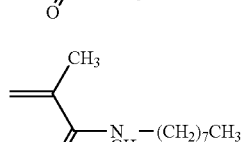 A-32
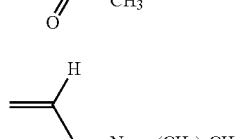 A-33
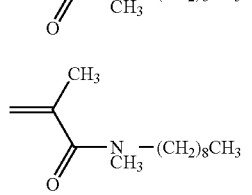 A-34
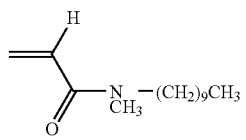 A-45
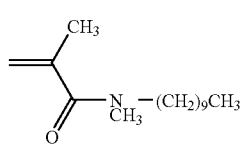 A-46
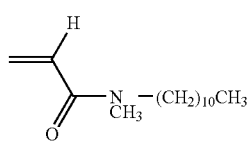 A-47
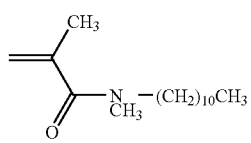 A-48
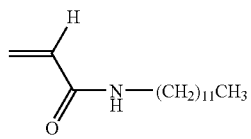 A-49
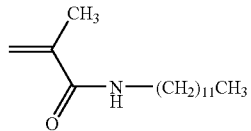 A-50
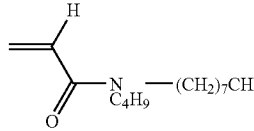 A-51
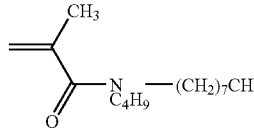 A-52
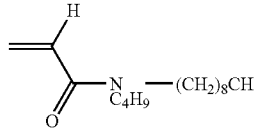 A-53
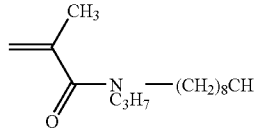 A-54
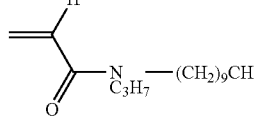 A-55

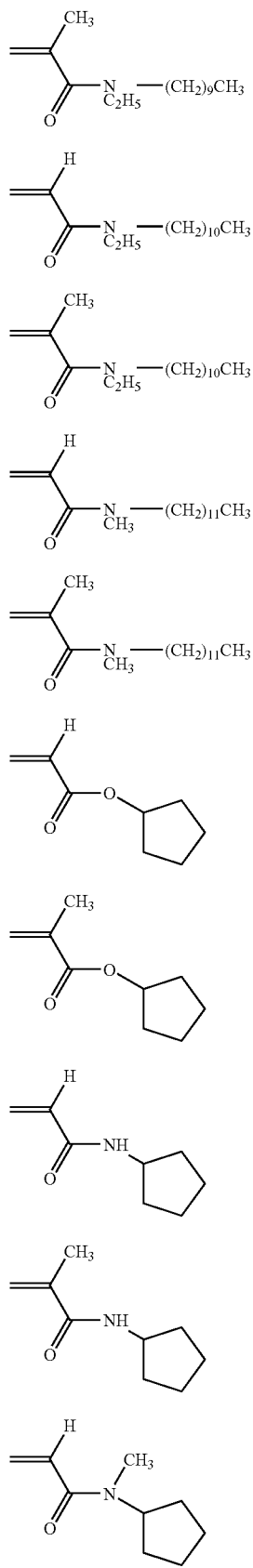
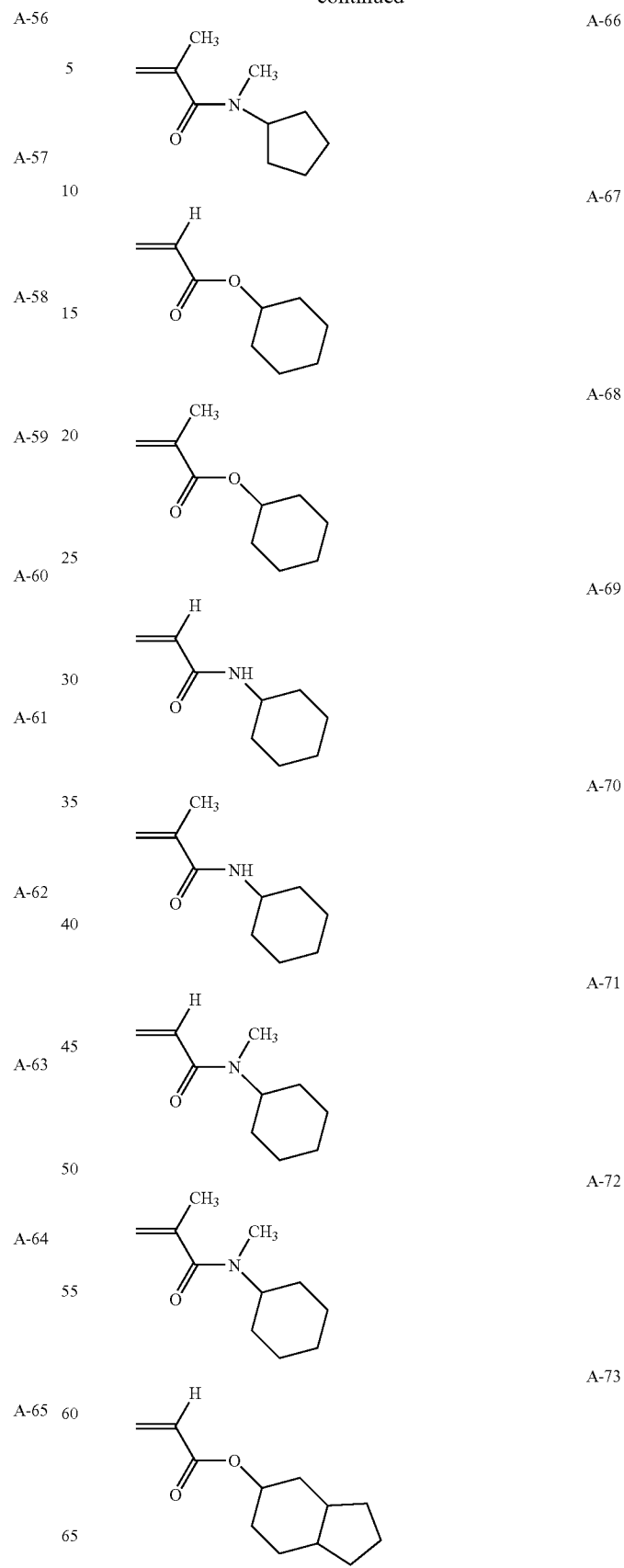

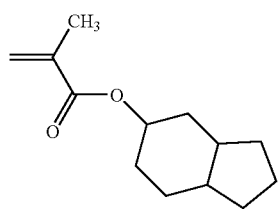
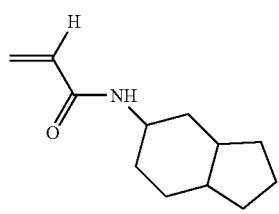  A-74
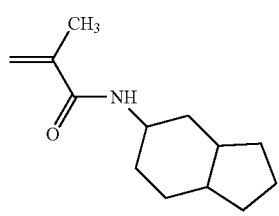  A-75
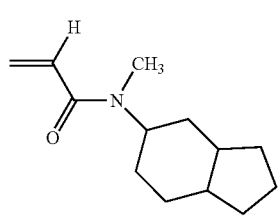  A-76
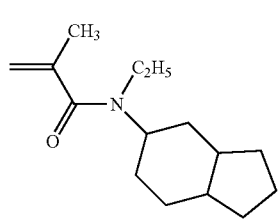  A-77
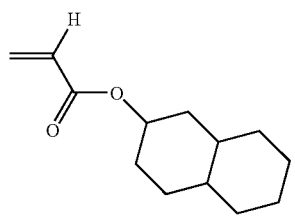  A-78
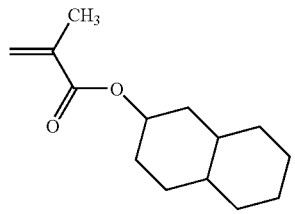  A-79
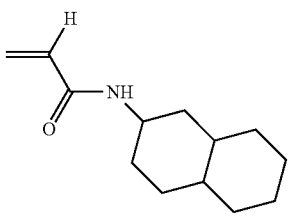  A-80
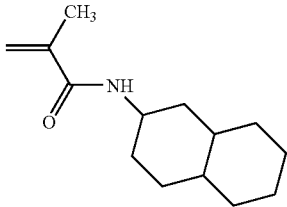  A-81
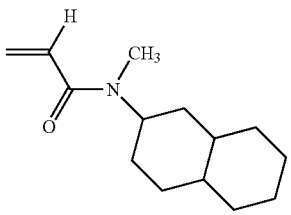  A-82
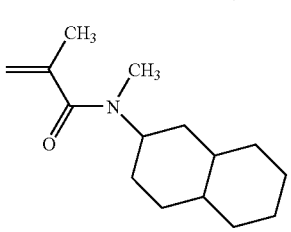  A-83
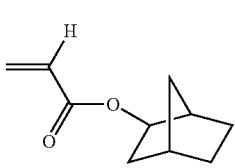  A-84
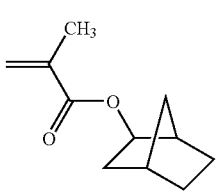  A-85
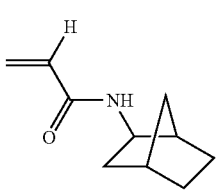  A-86
A-87
A-88

-continued
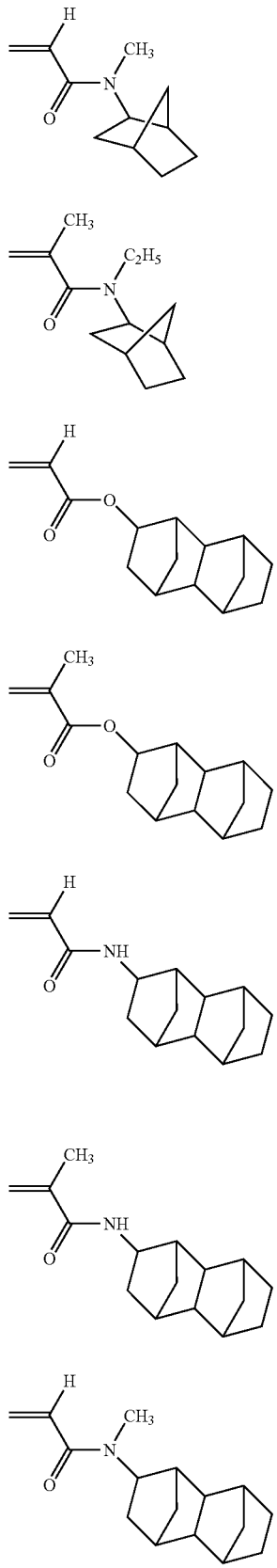
A-89
A-90
A-91
A-92
A-93
A-94
A-95
-continued
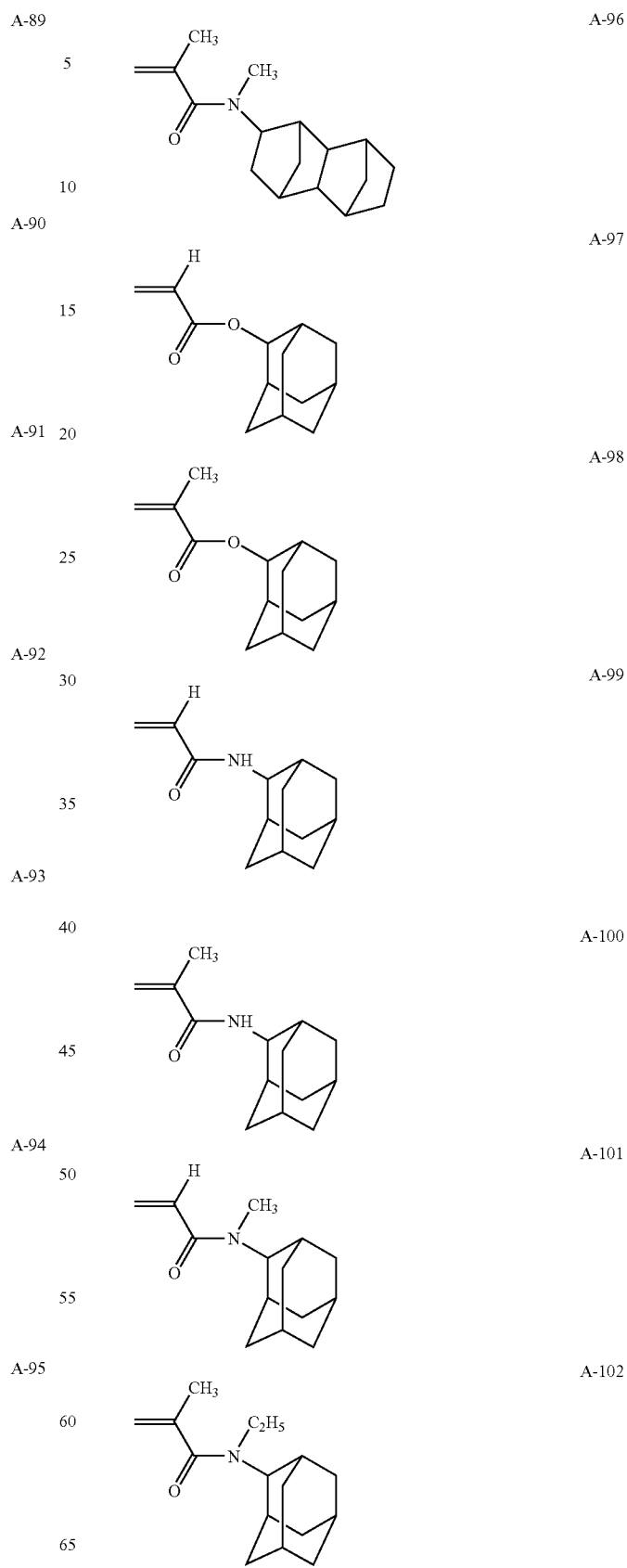
A-96
A-97
A-98
A-99
A-100
A-101
A-102

A-103 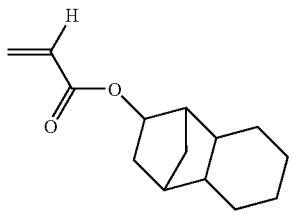
A-104 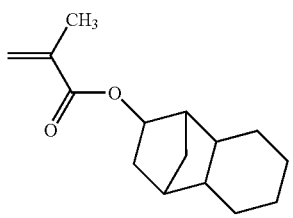
A-105 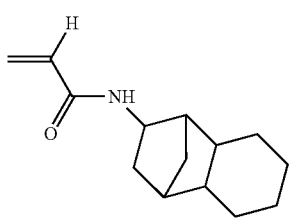
A-106 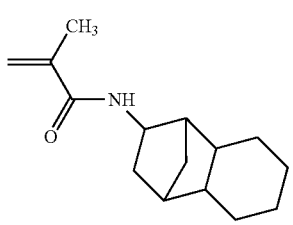
A-107 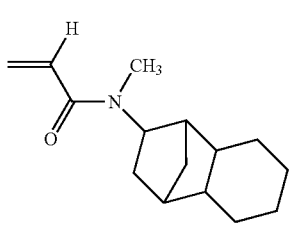
A-108 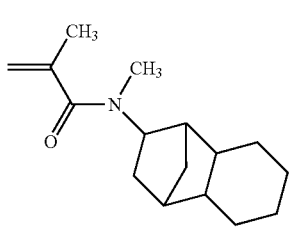
A-109 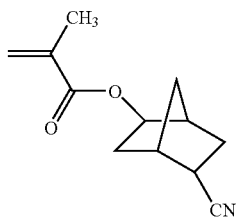
A-110 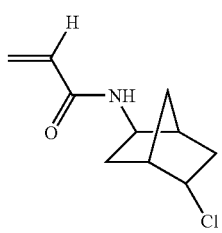
A-111 through A-115 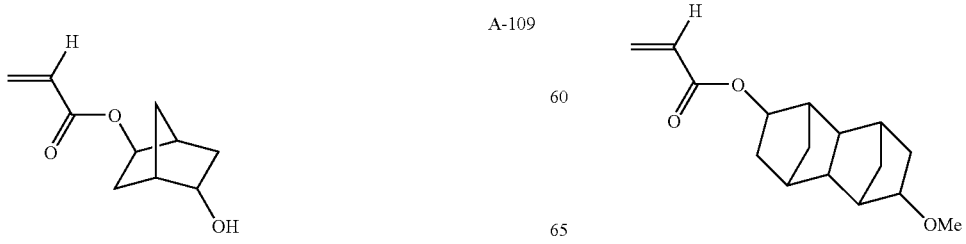

-continued

A-116 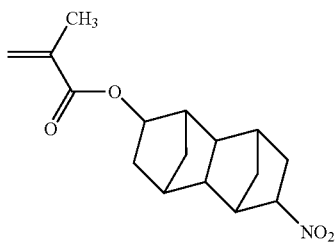

A-117 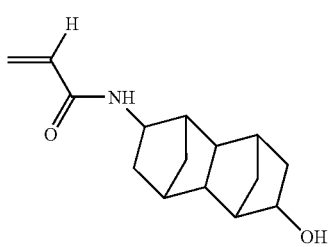

A-118 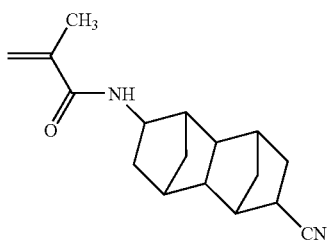

A-119 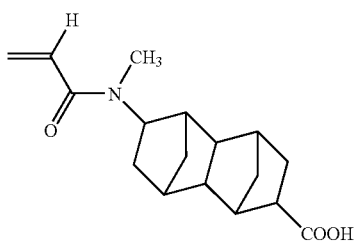

A-120 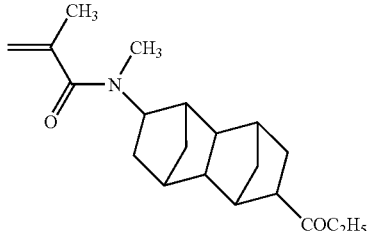

A-121 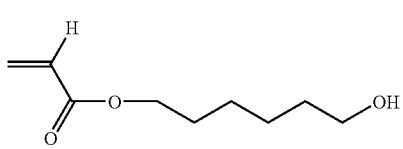

A-122 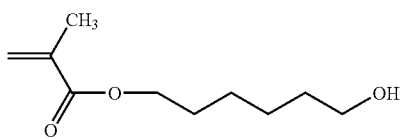

A-123 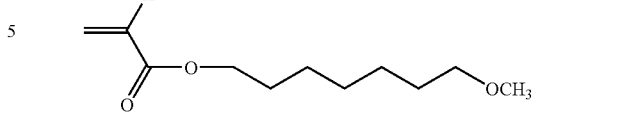

A-124 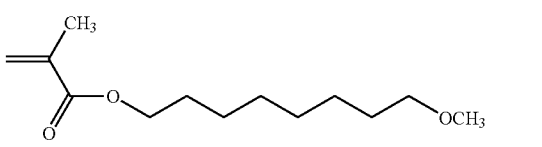

A-125, A-126 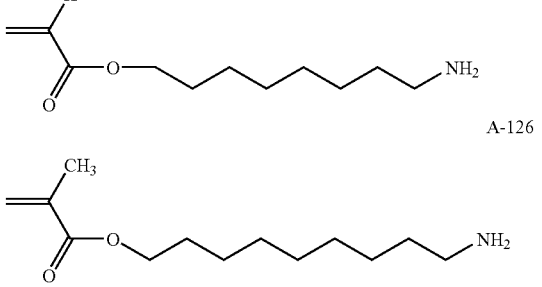

A-127, A-128 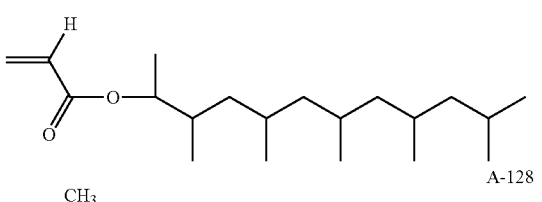

A-129, A-130 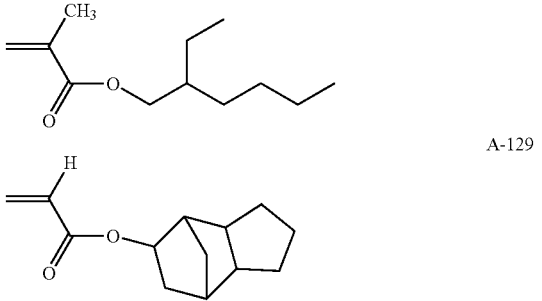

From the viewpoints as discussed above, the graft polymer to be used in the invention preferably has a mode represented by the above formula [5]

In the formula [5], $R^1$ to $R^6$, p and L' are each as defined in the formula [3]. $R^{11}$, $R^{12}$ and X are each as defined in the formula [4]. a and b represent the mass fractions (%) of the respective components, provided that $0.01 \leq a \leq 100$, preferably $1 \leq a \leq 80$ and still preferably $10 \leq a \leq 70$; and $0 \leq b \leq 95$, preferably $1 \leq b \leq 90$ and still preferably $10 \leq b \leq 50$.

Also, use may be made of two or more types of the polysiloxane-containing vinyl monomers represented by the formula [3], provided that that $0.01 \leq a \leq 100$, preferably $1 \leq a \leq 80$ and still preferably $10 \leq a \leq 70$, referring a as the sum of the monomers; and $0 \leq b \leq 95$, preferably $1 \leq b \leq 90$ and still preferably $10 \leq b \leq 50$, referring b as the sum of the monomers.

The mass-average molecular weight of the polymer having a polymer graft part containing a polysiloxane segment to be used in the invention preferably ranges from 3,000 to 100,000, still preferably from 6,000 to 80,000 and still preferably from 8,000 to 60,000.

The mass-average molecular weight and molecular weight are values expressed in terms of polystyrene which are measured with a GPC analyzer provided with TSKgel GMHxL®, TSKgel G4000HxL® and TSKgel G2000HxL® (each manufactured by TOSOH CO.) columns by using THF as a solvent and a differential refractometer.

The graft polymer according to the invention can be produced by a publicly known method employed in the art. For example, it can be produced by adding a commonly employed radical polymerization initiator to the monomers in an organic solvent as will be described hereinafter and effecting polymerization. Alternatively, it can be produced by adding another addition-polymerizable unsaturated compound and using the publicly known method employed in the art as described above. Moreover, the dropping polymerization method, which comprises dropping monomers and an initiator into a reactor depending on the polymerizability of each monomer and polymerizing the same, is effective in obtaining a polymer of a homogeneous composition.

Next, specific structures of the graft polymer according to the invention will be presented, though the invention is not restricted thereto.

In the following formula, S represents a repeating unit containing the polysiloxane segment in a side chain as described above. A represents a repeating unit derived from the monomer represented by the above formula [4]. a and b represent the mass fractions (%) of the respective components.

| | −(S)$_a$−(A)$_b$− | | |
|---|---|---|---|
| S | A | a | b |
| P-1 | S-(1) | A-1 | 80 | 20 |
| P-2 | S-(1) | A-1 | 60 | 40 |
| P-3 | S-(1) | A-1 | 30 | 70 |
| P-4 | S-(1) | A-1 | 75 | 25 |
| P-5 | S-(1) | A-1 | 55 | 45 |
| P-6 | S-(2) | A-1 | 25 | 75 |
| P-7 | S-(2) | A-2 | 80 | 20 |
| P-8 | S-(2) | A-2 | 60 | 40 |
| P-9 | S-(2) | A-2 | 30 | 70 |
| P-10 | S-(2) | A-3 | 80 | 20 |
| P-11 | S-(8) | A-3 | 75 | 25 |
| P-12 | S-(8) | A-3 | 55 | 45 |
| P-13 | S-(8) | A-14 | 80 | 20 |
| P-14 | S-(8) | A-14 | 60 | 40 |
| P-15 | S-(8) | A-14 | 30 | 70 |
| P-16 | S-(17) | A-35 | 80 | 20 |
| P-17 | S-(17) | A-35 | 30 | 70 |
| P-18 | S-(17) | A-35 | 75 | 25 |
| P-19 | S-(17) | A-42 | 80 | 20 |
| P-20 | S-(17) | A-42 | 60 | 40 |
| P-21 | S-(1) | A-64 | 80 | 20 |
| P-22 | S-(1) | A-64 | 60 | 40 |
| P-23 | S-(1) | A-64 | 30 | 70 |
| P-24 | S-(1) | A-77 | 25 | 75 |
| P-25 | S-(1) | A-77 | 80 | 20 |
| P-26 | S-(2) | A-77 | 60 | 40 |
| P-27 | S-(2) | A-81 | 30 | 70 |

-continued

| | −(S)$_a$−(A)$_b$− | | |
|---|---|---|---|
| S | A | a | b |
| P-28 | S-(2) | A-81 | 80 | 20 |
| P-29 | S-(2) | A-81 | 75 | 25 |
| P-30 | S-(2) | A-85 | 55 | 45 |
| P-31 | S-(8) | A-85 | 80 | 20 |
| P-32 | S-(8) | A-85 | 60 | 40 |
| P-33 | S-(8) | A-111 | 30 | 70 |
| P-34 | S-(8) | A-111 | 80 | 20 |
| P-35 | S-(8) | A-111 | 35 | 65 |
| P-36 | S-(17) | A-123 | 75 | 25 |
| P-37 | S-(17) | A-123 | 55 | 45 |
| P-38 | S-(1), S-(17) | A-123 | 40, 40 | 20 |
| P-39 | S-(1), S-(17) | A-130 | 30, 30 | 40 |
| P-40 | S-(1), S-(17) | A-130 | 20, 10 | 70 |

The content of the polysiloxane segment represented by the formula [1] in the graft polymer according to the invention having the polysiloxane segment in a side chain preferably amounts to 10% by mass to 90% by mass, still preferably 30% by mass to 80% by mass.

In the antireflective layer according to the invention, the addition level of the graft polymer according to the invention is preferably from 0.1% by mass to 50% by mass, still preferably from 1% by mass to 10% by mass based on the total solid matters in the low refractive index layer.

It is also possible to use tow or more types of graft polymers. In this case, the total addition level of the graft polymers is preferably from 0.1% by mass to 50% by mass, still preferably from 1% by mass to 10% by mass based on the total solid matters in the lowrefractiveindexlayer. Bycontrollingtheadditionlevelwithin this range, improved coating properties can be established.

To impart antifouling properties, it is preferable to introduce a second polysiloxane structure into the fluorine-containing copolymer according to the invention. The second polysiloxane structure maybe introduced by an arbitrary method without restriction. For example, it is preferable to employ a method of introducing a polysiloxane block copolymerization component with the use of a silicone macroazo initiator as reported by JP-A-11-189621, JP-A-11-228631 and JP-A-2000-313709, or a method of introducing a polysiloxane graft copolymerization component with the use of a silicone macromer as reported by JP-A-2-251555 and JP-A-2-308806. Such a polysiloxane Component is preferably employed in an amount of from 0.5 to 10% by mass, particularly preferably form 1 to 5% by mass in the polymer.

In order to impart antifouling properties, it is also preferred, in addition to the above-described methods, to employ a reactive group-containing polysiloxane (for example, KF-100T®, X-22-169AS®, KF-102®, X-22-3701IE®, X-22-164b®, X-22-5002®, X-22-173b®, X-22-174d®, X-22-167b® and X-22-161AS®, each manufactured by SHIN-ETSU CHEMICAL Co., Ltd.; AK-5®, AK-30® and AK-32®, each manufactured by TOAGOSEI Co., Ltd.; SILAPLANE FM0725® and SILAPLANE FM0721®, each manufactured by CHISSO CORPORATION). In this case, it is preferable to add such polysiloxane in an amount of from 0.5 to 10% by mass, still preferably from 1 to 5% by mass, based on the total solid matters in the low refractive index layer.

Because of being contained in the low refractive index layer, the inorganic filler preferably has a low refractive index. Preferable examples of the inorganic filler include silica and magnesium fluoride, and silica is still preferable.

The average particle size of the inorganic filler preferably ranges from 0.001 to 0.2 μm, still preferably from 0.001 to 0.05 μm. It is preferable that the filler particles are as close as possible in size (i.e., mono-dispersion).

As the inorganic filler, use may be also made of a mixture of two types of fillers having different particle sizes. By using a combination of an inorganic filler having a particle size of 0.03 to 0.05 μm with another inorganic filler having a particle size of 0.02 μm or less, in particular, both of favorable refractive index and high scratch resistance can be established. The ratio of the contents of these two inorganic fillers having different particle sizes can be freely altered within a range of from 0 to 1 depending on the balance between the desired refractive index and scratch resistance. To lower the refractive index, it is preferred that an inorganic filler having a smaller particle size is used as the major component. To enhance the scratch resistance, on the other hand, it is preferred to increase the content of an inorganic filler having a larger particle size.

The content of the inorganic filler is preferably from 5 to 90% by mass, still preferably from 10 to 70% by mass and particularly preferably from 10 to 50% by mass based on the mass of the whole low refractive index layer.

It is also preferred to employ the inorganic filler after surface-treating. Examples of the surface treatment method include physical surface treatments such as plasma discharge treatment and corona discharge treatment and a chemical surface treatment with the use of, for example, a coupling agent. It is preferable to employ a coupling agent. As the coupling agent, use is preferably made of alkoxy-metal compounds containing a hydrolysate of an organosilane represented by the formula (8) as will be described hereinafter and/or its partial condensation product (for example, a titanium coupling agent or a silane coupling agent). In the case of using silica as the inorganic filler, it is particularly effective to employ a silane coupling treatment.

Although the hydrolysate of an organosilane represented by the formula (8) as will be described hereinafter and/or its partial condensation product may be used as a surface-treating agent for the inorganic filler in the low refractive index layer before the preparation of a coating solution for forming the layer, it is preferable to add the agent as an additive in the course of forming the coating solution for the layer to thereby form a low refractive index layer containing the agent.

In the invention, at least one of the hard coat layer and the low refractive index layer contains at least one of an organosilane compound, its hydrolysate and its partial condensation product as a so-called sol component (hereinafter also called sp) to thereby enhance the interlayer adhesiveness. It is particularly preferable that the low refractive index layer contains at least one of an organosilane compound, its hydrolysate and its partial condensation product so as to establish both of favorable antireflective properties and high scratch resistance. It is also preferable that the hard coat layer contains at least one of an organosilane compound, its hydrolysate and its partial condensation product.

The organosilane compound is represented by the following formula [8].

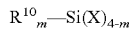 Formula [8]:

In the above formula [8], $R^{10}$ represents a substituted or unsubstituted alkyl group or a substituted or unsubstituted aryl group and an unsubstituted alkyl group or an unsubstituted aryl group is preferred.

As the alkyl group, it is preferable to use one having from 1 to 30 carbon atoms, still preferably from 1 to 16 carbon atoms and particularly preferably from 1 to 6 carbon atoms. Specific examples thereof include methyl, ethyl, propyl, isopropyl, hexyl, t-butyl, sec-butyl, hexyl, decyl and hexadecyl groups. Examples of the aryl group include phenyl and naphthyl groups and a phenyl group is preferred.

X represents a hydroxyl group or a hydrolyzable group. As the hydrolyzable group, citation may be made of alkoxy groups (preferably having from 1 to 5 carbon atoms such as methoxy and ethoxy groups), halogen atoms (for example, Cl, Br and I) and $R^2COO$ (wherein $R^2$ preferably represents a hydrogen atom or an alkyl group having from 1 to 5 carbon atoms, such as $CH_3COO$ and $C_2H_5COO$). Alkoxy groups are preferable and a methoxy group or an ethoxy group is still preferable.

m is an integer of from 1 to 3. In the case where there are a plurality of $R^{10}$s or Xs, they may be either the same or different. m is preferably 1 or 2, still preferably 1.

Although the substituent occurring in $R^{10}$ is not particularly restricted, examples thereof include halogen atoms (for example, fluorine, chlorine and bromine atoms), hydroxyl group, mercapto group, carboxyl group, epoxy group, amino group, alkyl groups (for example, methyl, ethyl, i-propyl, propyl and t-butyl groups), aryl groups (for example, phenyl and naphthyl groups), aromatic heterocyclic groups (for example, furyl, pyrazolyl and pyridyl groups), alkoxy groups (for example, methoxy, ethoxy, i-propoxy and hexyloxy groups), aryloxy groups (for example, phenoxy group), alkylthio groups (for example, methylthio and ethylthio groups), arylthio groups (for example, phenylthio group), alkenyl groups (for example, vinyl and 1-propenyl groups), acyloxy groups (for example, acetoxy, acryloyloxy and methacryloyloxy groups), alkoxycarbonyl groups (for example, methoxycarbonyl and ethoxycarbonyl groups), aryloxycarbonyl groups (for example, phenoxycarbonyl group), carbamoyl groups (for example, carbamoyl, N-methylcarbamoyl, N,N-dimethylcarbamoyl and N-methyl-N-octylcarbamoyl group), and acylamino groups (for example, acetylamino, benzoylamino, acrylamino and methacrylamino groups). These substituents may be further substituted by the above-described substituents.

In the case where there are a plurality of $R^{10}$s, it is preferable that at least one of them is a substituted alkyl group or a substituted aryl group. Among all, an organosilane compound having a vinyl-polymerizable group represented by the following formula [9] is preferred.

Formula [9]:

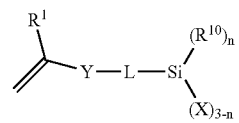

In the above formula [9], $R^1$ represents a hydrogen atom, a methyl group, a methoxy group, an alkoxycarbonyl group, a cyano group, a fluorine atom or a chlorine atom. As the alkoxycarbonyl group, a methoxycarbonyl group, an ethoxycarbonyl group or the like may be cited. A hydrogen atom, a methyl group, a methoxy group, a methoxycarbonyl group, a cyano group, a fluorine atom or a chlorine atom is preferred, still preferably, a hydrogen atom, a methyl group, a methoxycarbonyl group, a fluorine atom or a chlorine atom, and particularly preferably a hydrogen atom or a methyl group.

Y represents a single bond, —COO—, —CON($R^{41}$)— or —O—, preferably a single bond, —COO— or —CON($R^{41}$)—, still preferably a single bond or —COO—, and particularly preferably —COO—. $R^{41}$ represents a hydrogen atom or an optionally substituted alkyl group having from 1 to 8 carbon atoms. Examples of the substituent occurring in $R^{41}$ include alkyl groups having from 1 to 6 carbon atoms (for example, methyl and ethyl), aryl groups having from 6 to 10 carbon atoms (for example, phenyl), alkoxy groups having from 1 to 6 carbon atoms (for example, methoxy and ethoxy), alkoxycarbonyl groups having from 1 to 6 carbon atoms (for example, methoxycarbonyl), a cyano group, a fluorine atom and a chlorine atom.

L represents a divalent linking group. Specific examples thereof include substituted or unsubstituted alkylene groups, substituted or unsubstituted arylene groups, substituted or unsubstituted alkylene groups having a liking group (for example, ether, ester or amide) within molecule, and substituted or unsubstituted arylene groups having a liking group within molecule. Preferable examples thereof include substituted or unsubstituted alkylene groups having from 2 to 10 carbon atoms, substituted or unsubstituted arylene groups having from 6 to 20 carbon atoms and alkylene groups containing linking group therein and having from 2 to 10 carbon atoms; still preferably unsubstituted alkylene groups having from 2 to 8 carbon atoms, 1,3- or 1,4-phenylene group and alkylene groups containing ether or ester linking group therein and having from 2 to 8 carbon atoms; and particularly preferably unsubstituted alkylene groups having from 2 to 6 carbon atoms and alkylene groups containing ether or ester linking group therein and having from 2 to 6 carbon atoms. Examples of the substituent include halogen atoms, a hydroxyl group, a mercapto group, a carboxyl group, an epoxy group, alkyl groups and aryl groups. These substituents may be further substituted by the above substituents.

n is 0 or 1. A plurality of Xs may be either the same or different. n is preferably 0.

$R^{10}$ is as defined in the formula [8] and represents a hydroxyl group or a hydrolyzable group. Examples of the hydrolyzable group include alkoxy groups (preferably alkoxy groups having from 1 to 5 carbon atoms such as methoxy and ethoxy groups), halogen atoms (for example, Cl, Br and I) and $R^2COO$ (wherein $R^2$ preferably represents a hydrogen atom or an alkyl group having form 1 to 5 carbon atoms such as $CH_3COO$ or $C_2H_5COO$). An alkoxy group is preferred and a methoxy group or an ethoxy group is still preferred.

Use can be also made of two or more types of the compounds represented by the formula [8] or the formula [9]. Next, specific examples of the compounds represented by the formula [8] or the formula [9] will be presented, though the invention is not restricted thereto.

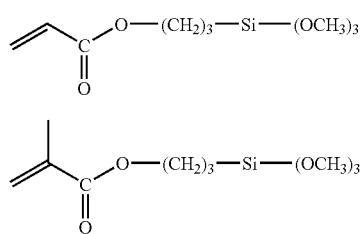

M-1

M-2

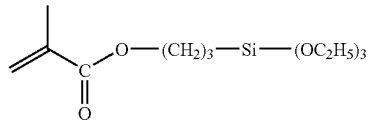

M-3

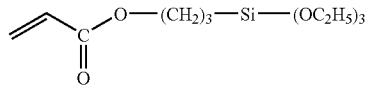

M-4

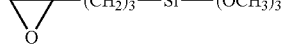

M-5

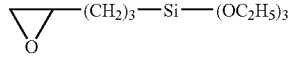

M-6

M-7

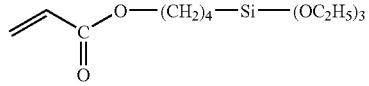

M-8

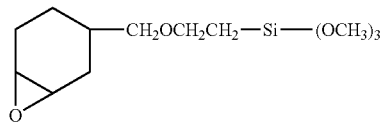

M-9

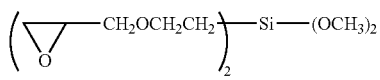

M-10

Among these specific examples, (M-1), (M-2) and (M-5) are particularly preferred.

To establish the advantages of the invention, the content of the above-described organosilane containing vinyl-polymerizable group is preferably from 30% by mass to 100% by mass, still preferably from 50% by mass to 100% by mass, still preferably from 70% by mass to 100% by mass and particularly preferably from 90% by mass to 100% by mass, based on the total content of the organosilane hydrolysate and/or its partial condensation product. It is undesirable that the content of the above-described organosilane containing vinyl-polymerizable group isless than 30% by mass, since therearise various troubles such as formation of solid matters, clouding in the solution, worsening in stability with the passage of time, difficulties in molecular weight control (i.e., increase in the molecular weight) and little improvement in the performance (for example, scratch resistance of antireflective layer) in polymerization due to a small content of the polymerizable group.

The mass-average molecular weight of the organosilane hydrolysate and/or its partial condensation product containing the above-described organosilane containing vinyl-polymerizable group, in the case of eliminating components of molecular weight less than 300, preferably ranges from 1000 to 20000, still preferably from 1000 to 10000, still preferably from 1100 to 5000, still preferably from 1200 to 3000 and still preferably from 1200 to 2000.

In the components having molecular weight of 300 or more contained in the organosilane hydrolysate and/or its partial condensation product, the content of components having molecular weight of 20000 or more is preferably not more than 20% by mass, still preferably not more than 15% by mass, still preferably not more than 10% by mass, still preferably not more than 6% by mass, and particularly preferably not more than 4% by mass.

It is also preferable that, in the components having molecular weight of 300 or more contained in the organosilane hydrolysate and/or its partial condensation product, the content of components having molecular weight of from 1000 to 20000 is not less than 80% by mass. When the content thereof is less than 80% by mass, a hardened film obtained by hardening a hardening composition containing the organosilane hydrolysate and/or its partial condensation product sometimes shows poor transparency or adhesiveness to the substrate.

The mass-average molecular weight and molecular weight are values expressed in terms of polystyrene which are measured with a GPC analyzer provided with TSKgel GMHxL®, TSKgel G4000HxL® and TSKgel G2000HxL® (each manufactured by TOSOH CO.) columns by using THF as a solvent and a differential refractometer. The content corresponds to the peak area percentage in the molecular weight range as defined above, referring the peak area of the components having molecular weight of not less than 300 as to 100%.

The degree of dispersion (mass-average molecular weight/number-average molecular weight) preferably ranges from 3.0 to 1.1, still preferably from 2.5 to 1.1, still preferably from 2.0 to 1.1 and particularly preferably from 1.5 to 1.1.

The condensation state of X as —OSi in the formula [8] or the formula [9] can be confirmed of by $^{29}$Si-NMR analysis of the organosilane hydrolysate partial condensation product.

By referring the ratio (T3/T2) as the degree of condensation (wherein T3 shows the case where three Si bonds are condensed as —OSi, while T2 shows the case where two Si bonds are condensed as —OSi), the degree of condensation of the organosilane hydrolysate partial condensation product preferably ranges from 0.5 to 3.5, still preferably from 0.5 to 3.0 and particularly preferably from 0.7 to 2.5.

When the degree of condensation is less than 0.5, hydrolysis and condensation have proceeded only insufficiently and thus the content of the monomer component increases, thereby causing insufficient hardening. When the degree of condensation exceeds 3.5, on the other hand, the hydrolysis and condensation have excessively proceeded and the hydrolyzable group is consumed. As a result, interactions with a binder polymer, a resin support, inorganic fine particles and so on are lowered and, therefore, scarcely any effects can be established.

The hydrolysis and/or condensation reaction of the organosilane can be carried out either in the absence of any solvent or in a solvent and thus the hardening composition according to the invention can be obtained. In the case of using a solvent, the concentration of the organosilane hydrolysate and/or its condensation product can be appropriately determined. As the solvent, it is preferable to employ an organic solvent so as to homogeneously mix the components. For example, use may be appropriately made of alcohols, aromatic hydrocarbons, ethers, ketones and esters.

It is preferable to use a solvent in which the organosilane and a catalyst are soluble. From the viewpoint of production procedure, it is favorable that the organic solvent is employed as a coating solution for low refractive index layer or a portion of the solution. Thus, it is favorable to employ a solvent which would not worsen the solubility or dispersibility when mixed with other materials such as the fluorine-containing copolymer.

As examples of the alcohols, monohydric alcohols and dihydric alcohols may be cited. As monohydric alcohols, saturated aliphatic alcohols having from 1 to 8 carbon atoms are preferable. Specific examples of such alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include methyl acetate, propyl acetate, butyl acetate and propylene carbonate.

Either one of these organic solvent or a mixture of two or more thereof may be used. The concentration of the solid matters in the solvent to be used in the reaction is usually from 1% by mass to 90% by mass, preferably from 20% by mass to 70% by mass, though the invention is not restricted thereto.

It is preferable to perform the hydrolysis and/or condensation reaction of the organosilane in the presence of a catalyst. As the catalyst, citation may be made of inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic amines such as triethylamine and pyridine; metal alkoxides such as triisopropoxyaluminum and tetrabutoxyzirconium; and metal chelate compounds. From the viewpoints of the production stability of the sol solution and the storage stability of the sol solution, it is preferable in the invention to use an acid catalyst (inorganic acid, organic acid) or a metal chelate compound. In inorganic acids, hydrochloric acid and sulfuric acid are preferred. In organic acids, those having an acid dissociation constant (pKa (25° C.)) in water of 4.5 or less are preferred. Hydrochloric acid, sulfuric acid and organic acids having an acid dissociation constant in water of 3.0 or less are still preferable; hydrochloric acid, sulfuric acid and organic acids having an acid dissociation constant in water of 2.5 or less are still preferable; organic acids having an acid dissociation constant in water of 2.5 or less are still preferable; methanesulfonic acid, oxalic acid, phthalic acid and malonic acid are still preferable; and oxalic acid is particularly preferable.

Metal chelate compounds are appropriately usable without specific restriction so long as having a metal selected from among Zr, Ti and Al as the center metal. Two or more metal chelate compounds may be used together within the above scope. Specific examples of these metal chelate compounds include zirconium chelate compounds such as tri-n-butoxyethylacetoacetate zirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; titanium chelate compounds such as diisopropoxy bis(ethylacetoacetate)titanium, diisopropoxy bis(acetylacetate)titanium and diisopropoxy bis(acetylacetone) titanium; and aluminum chelate compounds such as diisopropoxyethylacetoacetate aluminum, diisopropoxyacetylacetonate aluminum, isopropoxybis(ethylacetoacetate)aluminum, isopropoxybis(acetylacetonate)aluminum, tris(ethylacetoacetate)aluminum, tris(acetylacetonate)aluminum, and monoacetylacetonate bis(ethylacetoacetate)aluminum.

Among these metal chelate compounds, tri-n-butoxyethylacetoacetate zirconium, diisopropoxy bis(acetylacetonate) titanium, diisopropyloxyethylacetoacetate aluminum and tris(ethylacetoacetate)aluminum are preferable. One of these metal chelate compounds may be used alone. Alternatively, a mixture of two or more thereof may be used. Also, use can be made of a partly hydrolyzed product of such a metal chelate compound.

From the viewpoints of the condensation reaction speed and the layer strength after forming a coating layer, the metal chelate compound according to the invention is employed preferably in an amount of from 0.01 to 50% by mass, still preferably form 0.1 to 50% by mass and still preferably from 0.5 to 10% by mass based on the organosilane.

The hydrolysis/condensation reaction is usually performed by adding from 0.3 to 2 mol, preferably form 0.5 to 1 mol, of water per mol of the hydrolyzable group in the organosilane, and stirring in the presence or absence of the above solvent and in the presence of an acid catalyst at 25 to 100° C.

In the case where the hydrolyzable group is an alkoxide and the acid catalyst is an organic acid, proton is supplied from carboxyl group or sulfo group in the organic acid. Thus, the amount of the water to be added can be decreased. Namely, water is added in an amount of from 0 to 2 mol, preferably from 0 to 1.5 mol, still preferably form 0 to 1 mol and particularly preferably form 0 to 0.5 mol per mol of the alkoxide group in the organosilane. When an alcohol is employed as the solvent, it is also appropriate to substantially add no water.

In the case where the acid catalyst is an inorganic acid, the acid catalyst is used in an amount of form 0.01 to 10% by mol, preferably from 0.1 to 5% by mol based on the hydrolyzable group. In the case where the acid catalyst is an organic acid, the appropriate amount of the catalyst varies depending on the amount of added water. When water is added, the acid catalyst is used in an amount of form 0.01 to 10% by mol, preferably from 0.1 to 5% by mol based on the hydrolyzable group. When water is substantially not added, the acid catalyst is used in an amount of form 0.01 to 500% by mol, preferably from 1 to 200% by mol, still preferably from 20 to 200% by moll, still preferably form 50 to 150% by mol and particularly preferably from 50 to 120% by mol. based on the hydrolyzable group.

The reaction is carried out by stirring at 25 to 100° C., though it is favorable to control the reaction conditions depending on the reactivity of the organosilane.

The content of the organosilane different from layer to layer to which it is added. The organosilane content in the low refractive index layer preferably ranges from 0.1 to 50% by mass, still preferably form 0.5 to 20% by mass and particularly preferably from 1 to 10% by mass, based on the total solid matters in the low refractive index layer (in the case of containing). The organosilane content in a layer other than the low refractive index layer preferably ranges from 0.001 to 50% by mass, still preferably form 0.01 to 20% by mass, still preferably from 0.05 to 10% by mass and particularly preferably from 0.1 to 5% by mass, based on the total solid matters in the layer (in the case of containing).

In the antireflective layer according to the invention in which the hard coat layer is formed on the transparent substrate and the low refractive index layer is further formed thereon, it is also possible, depending on the performance to be established, to employ an antiglare hard coat layer as one hard coat layer.

In the antireflective layer according to the invention, it is also possible to form a non-antiglare hard coat layer below the antiglare hard coat layer to thereby enhance the layer strength.

Further, it is preferable to add an inorganic filler to each of the layers excluding the substrate. Either the same inorganic fillers or different ones may be added to individual layers. Namely, the type and amount of the inorganic filler are appropriately selected depending on the refractive index, layer strength, layer thickness, coating properties and so on of each layer.

The inorganic filler to be used in the invention is not particularly restricted in shape. For example, use can be preferably made of spherical, plate-like, fibrous, rod-like, irregular-shaped or hollow fillers, though spherical one is preferred because of having favorable dispersibility. Also, the inorganic filler is not restricted in type, though it is preferable to use an amorphous one. It is preferable that the inorganic filler is an oxide, nitride, sulfide or halide of a metal and a metal oxide is still preferred. Examples of the metal atom include Na, K, Mg, Ca, Ba, Al, Zn, Fe, Cu, Ti, Zr, Sn, In, W, Y, Sb, Mn, Ga, V, Nb, Ta, Ag, Si, B, Bi, Mo, Ce, Cd, Be, Pb and Ni. To obtain a transparent hardened layer, the average particle size of the inorganic filler is preferably controlled to 0.001 to 0.2 μm, still preferably 0.001 to 0.05 μm. The average particle size is measured with a Coulter's counter.

In the invention, means of using the inorganic filler is not particularly restricted. For example, it may be used in a dry state or as a dispersion in water or an organic solvent.

In the invention, it is also preferable to use a dispersion stabilizer so as to prevent the inorganic filler from aggregation and sedimentation. As the dispersion stabilizer, use can be made of polyvinyl alcohol, polyvinylpyrrolidone, cellulose derivatives, polyamides, phosphoric acid esters, polyethers, surfactants, silane coupling agents including the organosilane hydrolysate and/or its partial condensation product represented by the formula [8], and titanium coupling agents. A silane coupling agent is particularly preferred since a strong coating layer can be obtained after hardening by using the same. The silane coupling agent may be added as a dispersion stabilizer at an any amount without restriction. For example, it is preferable to add 1 part by mass or more of the silane coupling agent per 100 parts by mass of the inorganic filler. Also means of adding the dispersion stabilizer is not particularly restricted. For example, it may be added in a preliminarily hydrolyzed state. Alternatively, the silane coupling agent to be used as a dispersion stabilizer is mixed with the inorganic filler followed by hydrolysis and condensation. The latter procedure is preferred.

It is preferable to add the organosilane hydrolysate and/or its partial condensation product according to the invention represented by the formula [8] in preparing the coating solution for each layer as one of the constituents of the binder component, in addition to the use as a dispersion stabilizer.

Next, the antiglare hard coat layer according to the invention will be illustrated.

The antiglare hard coat layer comprises a binder for imparting hard coat properties, matting particles for imparting antiglare properties and an inorganic filler for achieving a high refractive index, preventing contraction due to crosslinkage and elevating the strength.

As the binder, it is preferable to use a polymer having a saturated hydrocarbon chain or a polyether chain as the main chain and a polymer having a saturated hydrocarbon chain is still preferable.

It is also preferable that the binder polymer has a crosslinked structure. As the binder polymer having a saturated hydrocarbon chain as the main chain, a polymer of an ethylenically unsaturated monomer is preferred. As the binder polymer having a saturated hydrocarbon chain as the main chain and a crosslinked structure, a polymer or a copolymer of monomer(s) having two or more ethylenically unsaturated bonds is preferable.

To achieve a high refractive index, it is possible to select a monomer having an aromatic ring or at least one atom selected from among halogen atoms other than fluorine, sulfur atom, phosphorus atom and nitrogen atom in its structure.

Examples of the monomer having two or more ethylenically unsaturated bonds include esters of polyhydric alcohol with (meth)acrylic acid (for example, ethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), divinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), acrylamides (for example, methylenebisacrylamide) and methacrylamides. Two or more of these monomers maybe used together. The term "(meth)acrylate" as used above means "acrylate or methacrylate".

Specific examples of the monomer having high refractive index include bis (4-methacryloylthiophenyl) sulfide, vinyl naphthalene, vinyl phenyl sulfide and 4-methacryloyloxyphenyl-4'-methoxyphenyl thioether. It is also possible to use two or more of these monomers together.

Such a monomer having ethylenically unsaturated bonds can be polymerized by ionizing radiation or heating in the presence of a photo radical polymerization initiator or a heat radical polymerization initiator.

That is to say, a coating solution of a composition, which contains the monomer having ethylenically unsaturated bonds, a photo radical polymerization initiator or a heat radical polymerization initiator, matting particles and an inorganic filler, is prepared. Then the coating solution is applied to the transparent substrate and hardened by polymerization under ionizing radiation or heating. Thus, an antireflective layer can be formed.

As the photo radical polymerization initiator, use can be made of acetophenones, benzoins, benzophenones, phosphineoxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethylacetophenone, 1-hydroxydimetmhyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonate, benzoin toluenesulfonate, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

Moreover, various examples of photo radical polymerization initiator are presented in *Saishin UVKoka Gijutsu*, (p.159, publisher: Kazuhiro Takausu, publishing office: GIJUTSU KYOKAI K.K.) and these initiators are useful in the invention.

As preferable examples of commercially available photo radical polymerization initiators of photo cleavage type, "IRGACURES (651, 184, 907)" (manufactured by Ciba-Geigy) may be cited.

The photo radical polymerization initiator is used preferably in an amount of from 0.1 to 15 parts by mass, still preferably from 1 to 10 parts by mass, per 100 parts by mass of the polyfunctional monomer.

In addition to the photo radical polymerization initiator, it is also possible to use a photo sensitizer. Specific examples of the photo sensitizer include n-butylamine, triethylamine, tri-n-butylphosphine, Micheler's ketone and thioxanthone.

As the heat radical initiator, use can be made of, for example, an organic or inorganic peroxide, an organic azo or diazo-compound.

More specifically speaking, examples of the organic peroxide include benzoyl peroxide, halogenobenzoyl peroxides, lauroyl peroxide, acetyl peroxide, dibutyl peroxide, cumene hydroxyperoxide and butyl hydroxyperoxide; examples of the inorganic peroxide include hydrogen peroxide, ammonium persulfate and potassium persulfate; examples of the azo compound include 2-azobisisobutyronitrile, 2-azobispropionitrile and 2-azobiscyclohexanedinitrile; and examples of the diazo compound include diazoaminobenzene and p-nitrobenzene diazonium.

As the binder polymer having polyether as the main chain, it is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator.

That is to say, a coating solution, which contains the polyfunctional epoxy compound, a photo acid generator or a heat acid generator, matting particles and an inorganic filler, is prepared. Then the coating solution is applied to the transparent substrate and then hardened by polymerization under ionizing radiation or heating. Thus, the antireflective layer can be formed.

It is also possible to use a monomer having a crosslinking functional group, as a substitute for the monomer having two or more ethylenically unsaturated bonds or in addition thereto, to thereby introduce the crosslinking functional group into the polymer. Thus, a crosslinked structure can be introduced into the binder polymer owing to the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsuflonic acid, acid anhydrides, cyanoacrylate derivatives, melamine, etherified methylol, esters and urethane and metal alkoxides such as tetramethoxysilane. It is also possible to use a functional group that shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

To impart antiglare properties, the antiglare hard coat layer preferably contains matting particles which are larger than the filler particles and have an average particle size of from 1 to 10 μm, preferably from 1.5 to 7.0 μm, such as particles of an inorganic compound or resin particles.

Specific examples of the matting particles include particles of inorganic compounds such as silica particles and $TiO_2$ particles; and resin particles such as crosslinked acryl particles, crosslinked styrene particles, melamine resin particles and benzoguanamine resin particles. Among all, crosslinked acryl particles such as crosslinked methyl polymethacrylate are preferred.

Also, use can be made of two or more types of matting particles having different particle sizes. The matting particles having a larger particle size can impart antiglare properties, while the matting particles having a smaller particle size can impart other optical characteristics. In the case of bonding an antireflective film to an ultrafine image display unit of 133 ppi or higher, for example, the unit should be free from any trouble in optical performance called dazzling. The problem of dazzling, which arises when pixels are enlarged or size-reduced due to irregularities (contributing to antiglare properties) on the film surface and the luminance becomes less uniform, can be considerably relieved by also using matting particles having a smaller particle size by 5 to 50% than the matting particles employed for imparting antiglare properties.

Concerning the particle size distribution of the matting particles, as described above, monodispersion is most desirable. That is to say, it is preferred that the sizes of individual particles are as close as possible. In the case where particles having particle size larger by 20% or more than the average particle size are specified as coarse particles, for example, it is preferable that the content of these coarse particles is 1% or less of all particles, still preferably 0.1% or less and still preferably 0.01% or less. Matting particles having such a particle size distribution can be obtained by classifying particles after the completion of a usual synthesis reaction. Matting particles having a still preferable distribution can be obtained by performing the classification in an increased number or at an elevated level.

To elevate the refractive index of the layer, the antiglare hard coat layer preferably contains, in addition to the matting particles as described above, an inorganic filler which comprises oxide of at least one metal selected from among titanium, zirconium, aluminum, indium, zinc, tin and antimony and preferably has an average particle size of from 0.001 μm to 0.2 μm, still preferably 0.001 μm to 0.05 μm.

To enlarge the difference in refractive index between the antiglare hard coat layer and the matting particles, it is also possible, in the antiglare hard coat layer with the use of matting particles having a high refractive index, to employ silicon oxide to thereby maintain the refractive index of the layer at a low level. The preferable particle size thereof is the same as the inorganic filler as described above.

Specific examples of the inorganic filler to be used in the antiglare hard coat layer include $TiO_2$, $ZrO_2$, $Al_2O_3$, $In_2O_3$, ZnO, $SnO_2$, $Sb_2O_3$, ITO (indium-tin oxide) and $SiO_2$. $TiO_2$ and $ZrO_2$ are preferred from the viewpoint of elevating refractive index. It is also preferable that the inorganic filler is surface-treated by silane coupling or titanium coupling. Use is preferably made of a surface-treating agent having a functional group capable of reacting with the binder on the filler surface.

The content of such an inorganic filler is preferably from 10 to 90% based on the total mass of the antiglare hard coat layer, still preferably from 20 to 80% and particularly preferably from 30 to 70%.

Because of having a particle size sufficiently smaller than the light wavelength, the inorganic filler causes no scattering. Therefore, a dispersion having the filler dispersed throughout the binder polymer behaves as an optically homogeneous substance.

The refractive index of the antiglare hard coat layer excluding the matting particles preferably ranges from 1.48 to 2.0, still preferably from 1.50 to 1.80. The refractive index can be controlled within the range as specified above by appropriately selecting the types and mixing ratio of the binder and the inorganic filler. It can be easily understood through preliminary experiments how to select these materials.

The layer thickness of the antiglare hard coat layer is preferably form 1 to 10 μm, still preferably form 1.2 to 6 μm.

In the antireflective layer according to the invention, use may be preferably made of a so-called smooth hard coat layer (i.e., having no antiglare properties) to enhance the film strength. This smooth hard coat layer is formed between the transparent substrate and the antiglare hard coat layer.

Materials to be used in the smooth hard coat layer are the same as those cited with respect to the antiglare hard coat layer except the matting particles which are employed for imparting antiglare properties. Namely, the smooth hard coat layer comprises a binder and an inorganic filler.

In the smooth hard coat layer according to the invention, it is preferable to use silica or alumina as the inorganic filler from the viewpoints of strength and wide availability and silica is particularly preferred. It is also preferable that the inorganic filler is surface-treated by silane coupling. Use is preferably made of a surface-treating agent having a functional group capable of reacting with the binder on the filler surface.

The content of the inorganic filler preferably ranges from 10 to 90%, still preferably from 20 to 80% and particularly preferably from 30 to 75%, based on the total mass of the hard coat layer. The layer thickness of the smooth hard coat layer is preferably from 1 to 10 μm, still preferably from 1.2 to 6 μm.

Concerning solvent species to be used in coating solutions for forming the hard coat layer and the low refractive index layer according to the invention, use may be made of either an organic solvent or a mixture of an organic solvent with water. However, a lower ratio of water is preferred. Namely, the water content preferably ranges from 0 to 30% by mass, still preferably from 0 to 10% by mass.

Such a coating solution may contain either a single solvent or a solvent mixture. It is preferred that the content of solvent(s) having a boiling point of 100° C. or lower amounts to 50 to 100% by mass, still preferably 80 to 100% by mass, still preferably 90 to 100% by mass and still preferably 100% by mass, in the total solvents. It is undesirable that the content of solvent(s) having a boiling point of 100° C. or lower is 50% by mass or less. This is because, in such a case, the coated face figure is worsened and the coating layer thickness becomes irregular due to extremely low drying speed, which brings about a fear of worsening in the optical characteristics such as refractive index. In the invention, these problems can be overcome by using a coating solution containing solvents having a boiling point of 100° C. or lower in a large amount.

Examples of the solvents having a boiling point of 100° C. or lower include hydrocarbons such as hexane (boiling point 68.7° C., hereinafter omitting "° C."), heptane (98.4), cyclohexane (80.7) and benzene (80.1); halogenated hydrocarbons such as dichloromethane (39.8), chloroform (61.2), carbon tetrachloride (76.8), 1,2-dichloroethane (83.5) and trichloroethylene (87.2); ethers such as diethyl ether (34.6), diisopropyl ether (68.5), dipropyl ether (90.5) and tetrahydrofuran (66); esters such as ethyl formate (54.2), methyl acetate (57.8), ethyl acetate (77.1) and isopropyl acetate (89); ketones such as acetone (56.1) and 2-butanone (=methyl ethyl ketone, 79.6); alcohols such as methanol (64.5), ethanol (78.3), 2-propanol (82.4) and 1-propanol (97.2); cyano compounds such as acetonitrile (81.6) and propionitrile (97.4); and carbon disulfide (46.2). Among all, ketones and esters are preferred and ketones are still preferred. Among the ketones, 2-butanone is particularly preferable.

Examples of solvents having boiling point of 100° C. or higher include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-dimethylformamide (153), N,N-dimethylacetamide (166) and dimethyl sulfoxide (189). Among them, cyclohexanone and 2-methyl-4-pentanone are preferred.

Coating solutions for forming the hard coat layer and the low refractive index layer according to the invention are prepared by diluting the components for these layers with the solvent of the above-described composition. The concentration of such a coating solution is preferably controlled by taking the viscosity of the coating solution, the specific gravity of layer material and so on into consideration. The concentration preferably ranges from 0.1 to 20% by mass, still preferably from 1 to 10% by mass.

As the transparent substrate in the antireflective film according to the invention, it is preferable to employ a plastic film. Examples of the polymer constituting the plastic film include cellulose esters {for example, triacetylcellulose and diacetylcellulose typified by FUJITAC TD80U and FUJITAC TD80UF, manufactured by FUJI PHOTOFILM Co., Ltd.), polyamides, polycarboantes, polyesters (for example, polyethylene terephthalate and polyethylene naphthalate), polystyrenes, polyolefins, norbornene resins (for example, ARTON manufactured by JSR) and amorphous polyolefins (for example, ZEONEX manufactured by ZEON)}. Among these materials, triacetylcellulose, polyethylene terephthalate and polyethylene naphthalate are preferable and triacetylcellulose is particularly preferable.

A triacetylcellulose film comprises either a single layer or a plurality of layers. A single-layered triacetylcellulose film is produced by the drum casting or band casting method disclosed in JP-A-7-11055 and soon. On the other hand, the latter multilayered triacetylcellulose film can be produced by the so-called simultaneous casting method disclosed in JP-A-61-94725, JP-B-62-43846 and so on. That is to say, starting triacetylcellulose flakes are dissolved in a solvent such as a halogenated hydrocarbon (for example, dichloromethane), an alcohol (for example, methanol, ethanol or butanol), an ester (for example, methyl formate or methyl acetate) or an ether (for example, dioxane, dioxolane or diethyl ether) followed by, if needed, the addition of various additives such as a plasticizer, an ultraviolet light absorber, an antioxidant, a slipping agent and a peeling accelerator. Then the obtained solution (hereinafter sometimes referred to as a dope) is cast onto a support in the form of a horizontal endless metallic belt or a rotating drum by using a dope-supplying means (hereinafter sometimes referred to as a die). In the case of producing a single-layered film, a single dope is cast to give a single layer. In the case of producing a multilayered film, a low concentration dope is cast together in both sides of a high concentration cellulose ester dope. When the dope(s) are dried to a certain extent on the support, the film to which rigidity has been thus imparted is peeled off from the support. Then, the film is passed thorough a drying part by using various transporting means to thereby eliminate the solvent.

Dichloromethane is a typical example of the solvent for dissolving triacetylcellulose as described above. Considering the global environment and working conditions, however, it is preferable to use a solvent substantially free from any halogenated hydrocarbons such as dichloromethane. The expression "substantially free from" means the halogenated hydrocarbon content in the organic solvent is less than 5% by mass (preferably less than 2% by mass).

In order to prepare a triacetylcellulose dope with the use of a solvent substantially free from any halogenated hydrocarbons, it is required to employ a specific dissolution method as will be illustrated hereinafter.

The first dissolution method which is called the cold dissolution method is carried out as follows. First, triacetylcellulose is slowly added to a solvent at a temperature around room temperature (−10 to 40° C.) under stirring. Next, the obtained mixture is cooled to −100 to −10° C. (preferably −80 to −10° C., still preferably −50 to −20° C. and most desirably −50 to −30° C.). The cooling can be carried out in, for example, a dry ice/methanol bath (−75° C.) or a cooled diethylene glycol solution (−30 to −20° C.). Due to the cooling, the mixture of triacetylcellulose with the solvent solidifies. Then it is heated to 0 to 200° C. (preferably 0 to 150° C., still preferably 0 to 120° C. and most desirably 0 to 50° C.) to give a solution of triacetylcellulose existing in a fluidized state in the solvent. The heating may be carried out either by merely allowing to stand at room temperature or by heating in a hot bath.

The second dissolution method which is called the hot dissolution method is carried out as follows. First, triacetylcellulose is slowly added to a solvent at a temperature around room temperature (−10 to 40° C.) under stirring. It is preferable that the triacetylcellulose solution according to the invention is prepared by adding triacetylcellulose in a solvent mixture containing various solvents and allowing it to swell therein. In this method, the dissolution concentration of triacetylcellulose is preferably 30% by mass or less, though a higher concentration is preferred from the viewpoint of drying efficiency in during the film formation. Next, the organic solvent mixture is heated to 70 to 240° C. (preferably 80 to 220° C., still preferably 100 to 200° C. and most desirably 100 to 190° C.) under elevated pressure of 0.2 MPa to 30 MPa. Since such a heated solution cannot be applied as such, it should be cooled to a temperature corresponding to the lowest boiling point of the solvents employed or lower. In this case, it is a common practice to cool the mixture to −10 to 50° C. and control the pressure to the atmospheric level. The cooling can be carried out by merely allowing the high-pressure and high-temperature container and the production line having the triacetylcellulose solution therein to stand at room temperature. It is still preferable to cool these devices with the use of a refrigerant such as cooling water. A cellulose acetate film substantially free form any halogenated hydrocarbons such as dichloromethane and a method of producing the same are described in Japan Institute of Invention and Innovation Journal of Technical Disclosure No.2001-1745 (2001.03.15, hereinafter abbreviated as Journal of Technical Disclosure No.2001-1745).

In using the antireflective film according to the invention in a liquid display unit, it is provided as the outermost face of the image display unit by, for example, forming an adhesive layer on one face. The antireflective film according to the invention may be combined with a polarizing plate. In the case where the transparent substrate is made of triacetylcellulose, triacetylcellulose is employed as a protective film for protecting the polarizing layer of a polarizing plate. Therefore, it is also favorable from the viewpoint of cost to employ the antireflective film according to the invention as such as a protective film.

In the case where the antireflective film according to the invention, optionally having an adhesive layer on one face, is provided as the outermost face of an image display unit or as a protective film for a polarizing plate as such, it is preferable to perform a saponification treatment, after forming an outermost layer (low refractive index layer) comprising a fluorine-containing copolymer as the main component on the substrate, to thereby achieve sufficient adhesiveness. The saponification can be carried out by a publicly known procedure, for example, dipping the film in an alkali solution for an appropriate time. After dipping in the alkali solution, it is preferable to sufficiently wash the film with water or neutralize the alkali component by dipping in a dilute acid, thereby eliminating the alkali component remaining in the film.

Due to the saponification treatment, the surface of the transparent substrate in the side opposite to the side having the outermost layer is made hydrophilic.

The hydrophilic surface is particularly effective in improving the adhesiveness to a polarizing layer comprising polyvinyl alcohol as the main component. Since dust and debris in the atmosphere hardly stick to the hydrophilic surface, moreover, dust and debris scarcely enter into the space between the polarizing layer and the antireflective film in the step of adhering to the polarizing layer, which brings about another advantage of preventing defect spots caused by dust and debris.

It is preferable to perform the saponification treatment so that the contact angle of the transparent substrate surface in the back face of the antireflective film to water becomes 40° or smaller, still preferably 30° or smaller and particularly preferably 20° or smaller.

In practice, the alkali saponification can be carried out by a procedure selected from among the following two means. Between these means, the means (1) is favorable from the viewpoint that the treatment can be carried out in the same step as the triacetylcellulose film formation commonly employed. However, the means (1) suffers from some problems such that the antireflective layer surface is also saponified and thus the layer is deteriorated due to alkali-hydrolysis and that the remaining saponification solution would cause stains. In contrast, the means (2) is favorable, though an additional step should be employed in this case.

(1) After forming the antireflective layer on the transparent substrate, the film is dipped at least once in an alkali solution to thereby saponify the back face of the film.

(2) Before or after forming the antireflective layer on the transparent substrate, an alkali solution is applied on the face of the transparent substrate opposite to the face on which the antireflective film is to be formed. Then the transparent substrate is heated, washed with water and/or neutralized to thereby saponify the back face alone of the antireflective film.

The antireflective film according to the invention can be produced by forming individual layers on the transparent substrate by the following methods, though the invention is not restricted thereto.

First, coating solutions containing the components for forming individual layers are prepared. Next, the coating solution for forming hard coat layer is applied to the transparent substrate by dip coating method, air knife coating method, curtain coating method, roller coating method, wire bar coating method, gravure coating method or extrusion coating method (U.S. Pat. No. 2,681,294), followed by heating and drying. It is particularly preferable to employ the microgravure coating method. Next, the coating layer is hardened by polymerizing the monomer for forming the antiglare hard coat layer by light irradiation or heating. Thus, a hard coat layer is formed.

If needed, a plurality of hard coat layers may be formed. Namely, a smooth hard coat layer is applied and hardened in the same manner before the application of the antiglare hard coat layer.

Next, the coating solution for forming low refractive index layer is applied on the hard coat layer and light-irradiated or heated to thereby form a low refractive index layer. Thus, the antireflective film according to the invention can be obtained.

The microgravure coating method to be used in the invention is a coating method which comprises providing a gravure roll (diameter: about 10 to 10 mm, preferably about 20 to 50 mm) having a gravure pattern printed all around the peripheral face under the substrate, counterrotating the gravure roll against the substrate-conveying direction, scratching off the excessive coating solution from the gravure roll surface with a doctor blade, and thus conveying and applying a definite amount of the coating solution to the lower face of the substrate at a position where the upper face of the substrate is in the free state. According to this method, coating can be carried out by continuously unwinding the rolled transparent substrate, and applying at least one layer among the hard coat layers and the low refractive index layer containing fluorine-containing copolymer by the microgravure method to one side of the substrate thus unwound.

Coating conditions to be used in the microgravure coating method are as follows. Namely, the line count in the gravure pattern printed on the gravure roll preferably ranges from 50 to 800 lines/in., still preferably from 100 to 300 lines/in. The gravure pattern depth preferably ranges from 1 to 600 μm, still preferably from 5 to 200 μm. The rotation speed of the gravure roll preferably ranges from 3 to 800 rpm, still preferably from 5 to 200 rpm. The transfer speed of the substrate preferably ranges from 0.5 to 100 m/min, still preferably from 1 to 50 m/min.

The antireflective film thus obtained has a haze value preferably ranging from 3 to 50%, still preferably form 4 to 45%, and an average reflectivity to light (wavelength: 450 nm to 650 nm) of preferably 2.2% or lower, still preferably 1.9% or lower.

So long as the haze value and the average reflectivity of the antireflective film according to the invention respectively fall within the ranges as defined above, favorable antiglare properties and antireflective properties can be established without worsening transmission image.

In usual, a polarizing plate comprises a polarizing layer and two protective films provided in both side thereof. It is preferable in the invention that the antireflective film according to the invention is employed as at least one of these protective films between which the polarizing film is inserted. By using the antireflective film also as the protective film, the production cost of the polarizing plate can be reduced. By using the antireflective film as the outermost layer, the reflection of outside light can be prevented and a polarizing plate having excellent scratch resistance, antifouling properties and so on can be obtained.

As the polarizing film, use may be made of a publicly known polarizing film or a polarizing film cut out from a continuous polarizing layer sheet the absorption axis of which is neither parallel nor perpendicular to the lengthwise direction. Such a continuous polarizing layer sheet the absorption axis of which is neither parallel nor perpendicular to the lengthwise direction can be produced by the following method.

That is, it can be produced by a stretching method which comprises stretching a polymer film by applying a tension while holding both ends of the film by holding members, stretching the thus obtained polarizing layer at a stretching ratio of at least 1.1 to 20.0 in the film width direction, and flexing the film-traveling direction while holding its both ends so that the difference in the speed in the lengthwise direction between the holding members at the both ends of the film is not more than 3% and the angle between the film-traveling direction at the outlet of the step holding the both ends of the film and the actual stretching direction of the film is inclined at 20 to 70°. From the viewpoint of productivity, a film with an incline angle of 45° is preferably employed.

The polarizing layer can be stretched in accordance with the method described in detail in paragraphs [0020] to [0030] in JP-A-2002-86554.

The antireflective film according to the invention and the polarizing plate having this antireflective film so that the low refractive index layer serves as the outermost layer are applicable to image display units such as a liquid crystal display (LCD), a plasma display panel (PDP), an electroluminescence display (ELD) and a cathode ray tube. (CRT). Because of having the transparent substrate, the transparent substrate side of the antireflective film according to the invention is bonded to the image display face of the image display unit. In the case of using a polarizing plate having the antireflective film according to the invention bonded thereto, it is bonded to the display face of a display unit so that the low refractive index layer serves as the outermost surface of the display unit.

As one of the surface-protective films of a polarizing layer, the antireflective film according to the invention is preferably usable in liquid crystal display units of transmission, reflection and semi-transmission modes such as twisted nematic (TN), super-twisted nematic (STN), vertical alignment (VA), in-place switching (IPS) and optically compensated bend cell (OCB) modes.

Liquid crystal cells of the VA mode include: (1) a liquid crystal cell of VA mode in a narrow sense, in which rod-like liquid crystal molecules are essentially vertically aligned while voltage is not applied, and the molecules are essentially horizontally aligned while voltage is applied (JP-A-2-176625); (2) a liquid crystal cell of MVA mode, in which the VA mode is modified to be multi-domain type so as to enlarge the viewing angle (described in SID97, Digest of tech. Papers, 28(1997), 845); (3) a liquid crystal cell of n-ASM mode, in which rod-like liquid crystal molecules are essentially vertically aligned while voltage is not applied, and the molecules are essentially oriented in twisted multi-domain alignment while voltage is applied (described in Nippon Ekisho Toronkai [Liquid crystal forum of Japan], Digest of tech. Papers (1998), 58-59); and (4) a liquid crystal cell of SURVAIVAL mode (published in LCD international 98).

A liquid crystal cell of the OCB mode is a liquid crystal display unit with the use of a liquid crystal cell of bed alignment mode, in which rod-like liquid crystal molecules are aligned essentially in opposite directions (symmetrically) in the upper part and the lower part, as disclosed in U.S. Pat. No. 4,583,825 and U.S. Pat. No. 5,410,422. Since the rod-like liquid crystal molecules are symmetrically aligned in the upper part and the lower part, this liquid cell of the bend alignment mode has a self-optically compensatory function. Therefore, this liquid crystal mode is also called OCB (optically compensatory bend) liquid crystal mode. Such a liquid crystal display device of the bend alignment mode has an advantage of having a high response speed.

A liquid crystal cell of the ECB mode, in which rod-like liquid crystal molecules are essentially horizontally aligned while voltage is not applied, has been most frequently used as a color TFT liquid crystal display unit and reported in a large number of documents, for example, *EL, PDP, LCD Display*, Toray Research Center (2001).

As described in, for example, JP-A-2001-10004, it is particularly preferable that in liquid crystal display units of the TN mode and the IPS mode, an optically compensatory film is used in the opposite side of the antireflective film according to the invention, which is employed as one of the protective films in the front and back faces of a polarizing layer, to thereby give a polarizing plate having an antireflective effect and a viewing angle-enlarging effect at the thickness of a single polarizing plate alone.

EXAMPLES

Now, the invention will be illustrated in greater detail by reference to the following EXAMPLES. However, it is to be understood that the invention is not construed as being restricted thereto.

(Synthesis of graft polymer (P-8))

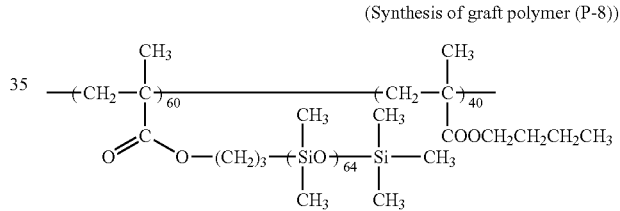

Into a stainless reactor equipped with a stirrer and a reflux condenser were added 31.94 g of SILAPLANE FM-0721 (manufactured by CHISSO CORPORATION), 7.99 g of butyl methacrylate, 1.1 g of dimethyl 2,2'-azobisisobutyrate and 30 g of butanone. The obtained mixture was heated in a nitrogen atmosphere to 78° C. for 6 hours to thereby complete the reaction. The mass-average molecular weight was $2.9 \times 10^4$.

(Synthesis of graft polymer (P-8))

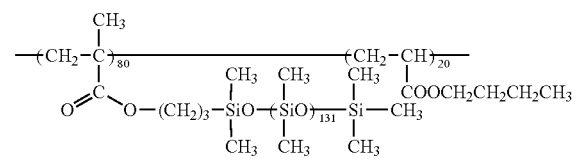

Into a stainless reactor equipped with a stirrer and a reflux condenser were added 23.96 g of SILAPLANE FM-0725 (manufactured by CHISSO CORPORATION), 15.97 g of butyl acrylate, 1.1 g of dimethyl 2,2'-azobisisobutyrate and 30 g of butanone. The obtained mixture was heated in a nitrogen atmosphere to 78° C. for 6 hours to thereby complete the reaction. The mass-average molecular weight was $2.1 \times 10^4$.

In the same manner, graft polymers (P-11), (P-21) and (P-40) were synthesized.

(Synthesis of fluorine-containing copolymer (A))

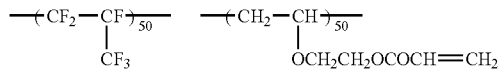

Into a stainless autoclave (capacity 100 ml) equipped with a stirrer were added 40 ml of ethyl acetate, 14.7 g of hydroxyethyl vinyl ether and 0.55 g of dilauroyl peroxide. After degassing, the system was purged with nitrogen. After further adding 25 g of hexafluoropropylene (HFP) into the autoclave, the mixture was heated to 65° C. When the temperature in the autoclave attained 65° C., the pressure was 5.4 kg/cm². While maintaining at this temperature, the reaction was continued for 8 hours. When the pressure attained 3.2 kg/cm², heating was stopped and the mixture was cooled by allowing to stand. When the internal temperature was lowered to room temperature, the unreacted monomer was eliminated and the autoclave was opened. Then the liquid reaction mixture was taken out and poured into hexane in large excess. Then the solvent was removed by decantation and the precipitated polymer was taken out. Further, this polymer was dissolved in a small amount of ethyl acetate and re-precipitated from hexane twice to thereby completely eliminate the remaining monomer. After drying, 28 g of the polymer was obtained. Then 20 g of this polymer was dissolved in 100 ml of N,N-dimethylacetamide. After dropping 11.4 g of acrylic acid chloride under ice-cooling, the mixture was stirred at room temperature for 10 hours. Then ethyl acetate was added to the liquid reaction mixture followed by washing with water. The organic layer was extracted and concentrated. The polymer thus obtained was re-precipitated from hexane to thereby give 19 g of a fluorine-containing copolymer (A). The refractive index of the obtained polymer was 1.421.

(Synthesis of fluorine-containing copolymer (B))

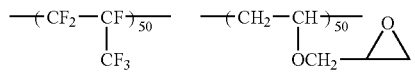

Into a stainless autoclave (capacity 100 ml) equipped with a stirrer were added 30 ml of ethyl acetate, 11.5 g of glycidyl vinyl ether and 0.42 g of dilauroyl peroxide. After degassing, the system was purged with nitrogen. After further adding 21 g of hexafluoropropylene (HFP) into the autoclave, the mixture was heated to 65° C. When the temperature in the autoclave attained 65° C., the pressure was 6.2 kg/cm².

While maintaining at this temperature, the reaction was continued for 8 hours. When the pressure attained 3.6 kg/cm², heating was stopped and the mixture was cooled by allowing to stand. When the internal temperature was lowered to room temperature, the unreacted monomer was eliminated and the autoclave was opened. Then the liquid reaction mixture was taken out and poured into hexane in large excess. Then the solvent was removed by decantation and the precipitated polymer was taken out. Further, this polymer was dissolved in a small amount of ethyl acetate and re-precipitated from hexane twice to thereby completely eliminate the remaining monomer. After drying, 21 g of a fluorine-containing copolymer (B) was obtained. The refractive index of the obtained polymer was 1.424.

(Preparation of Sol Solution a)

Into a reactor equipped with a stirrer and a reflux condenser were added 161 parts by mass of acryloyloxypropyltrimethoxysilane, 123 parts by mass of oxalic acid and 415 parts by mass of ethanol and mixed therein. After reacting at 70° C. for 4 hours, the reaction mixture was cooled to room temperature to thereby give a transparent sol solution a as a hardening composition according to the invention. It had a mass-weight average molecular weight of 1600 and components of from 1000 to 20000 in molecular weight amounted to 100% of the oligomer components and higher. When analyzed by gas chromatography, it was found out that no starting acryloxypropyltrimethoxysilane remained therein.

(Preparation of Sol Solution b)

Into a reactor equipped with a stirrer and a reflux condenser were added 161 parts by mass of methacryloyloxypropyltrimethoxysilane, 80 parts by mass of oxalic acid and 415 parts by mass of ethanol and mixed therein. After reacting at 70° C. for 4 hours, the reaction mixture was cooled to room temperature. Then 43 parts by mass of ethanol was added to thereby give a transparent sol solution b as a hardening composition according to the invention. It had a mass-weight average molecular weight of 1400 and components of from 1000 to 20000 in molecular weight amounted to 100% of the oligomer components and higher. When analyzed by gas chromatography, it was found out that no starting methacryloxypropyltrimethoxysilane remained therein.

(Preparation of Coating Solution for Hard Coat Layer)

135 g of a mixture of dipentaerythritol pentaacrylate with dipentaerythritol hexaacrylate "DPHA" (manufactured by NIPPON KAYAKU Co., Ltd.) was dissolved in 196 g of a solvent mixture (methyl ethyl ketone/cyclohexanone=50/50% by mass). To the obtained solution were added 300 g of a 30% methyl ethyl ketone dispersion of silica sol (MEK-ST, manufactured by NISSAN CHEMICAL INDUSTRIES, LTD., average particle size about 15 nm) and 25 g of the sol solution a. Further, a solution of 7.5 g of a photopolymerization initiator (Irgacure 907 manufactured by Ciba Specialty Chemicals) and 5.0 g of a photosensitizer (KAYACURE DETX, manufactured by NIPPON KAYAKU Co., Ltd.) dissolved in 82 g of methyl ethyl ketone was added thereto.

(Preparation of Coating Solution for antiglare Hard Coat Layer)

To 250 g of a marketed zirconia-containing UV-hardening hard coat solution (DESOLITE Z7401, manufactured by JSR, solid content 48%, zirconia content 71%, average particle size about 20 nm) were added 105 g of a mixture of dipentaerythritol pentaacrylate with dipentaerythritol hexaacrylate (DPHA, manufactured by NIPPON KAYAKU Co., Ltd.), 25.8 g of the sol solution a and 7.5 g of a photopolymerization initiator (Irgacure 907 manufactured by Ciba Specialty Chemicals), and the obtained mixture was diluted with 384 g of a solvent mixture (methyl ethyl ketone/cyclohexanone=50/50% by mass). Then the solution was applied and UV-hardened. The refractive index of the obtained coating layer was 1.61.

To the solution thus obtained, was added 29 g of a dispersion, which had been prepared by dispersing 20 g of crosslinked polystyrene particles (SX-200HD®, manufactured by SOKEN KAGAKU K.K.) having a number-average particle size of 1.99 μm and a standard deviation in particle size of 0.32 μm (corresponding to 16% of the number-average particle size) in 80 g of a solvent mixture (methyl ethyl ketone/cyclohexanone=54/46% by mass) in a high-speed disperser at 5000 rpm for 1 hour and then filtering through polypropylene filters having pore sizes of 10 μm, 3 μm and 1 μm (PPE-10®, PPE-03® and PPE-01® each manufactured by FUJI PHOTOFILM Co., Ltd.). After stirring, the mixture was filtered through a polypropylene filter of 30 μm in pore size to thereby give a coating solution for antiglare hard coat layer.

(Preparation of Coating Solution A for Low Refractive Index Layer)

To 15.2 g of the perfluoroolefin copolymer (A) were added 0.3 g of reactive silicone X-22-164B® (manufactured by SHIN-ETSU CHEMICAL Co.), 0.76 g of the graft polymer (P-8), 0.76 g of a photopolymerization initiator (Irgacure 907® manufactured by Ciba Specialty Chemicals), 293 g of methyl ethyl ketone and 9.0 g of cyclohexanone. After stirring, the obtained mixture was filtered through a polypropylene filter of 5 μm in pore size to thereby give a coating solution A for low refractive index layer.

(Preparation of Coating Solution B for Low Refractive Index Layer)

To 15.2 g of the perfluoroolefin copolymer (B) were added 0.3 g of reactive silicone X-22-169AS® (manufactured by SHIN-ETSU CHEMICAL Co.), 0.76 g of the graft polymer (P-1), 1.52 g of a photopolymerization initiator (UVI6990® manufactured by Nippon Unicar Co., Ltd.), 293 g of methyl ethyl ketone and 9.0 g of cyclohexanone. After stirring, the obtained mixture was filtered through a polypropylene filter of 5 μm in pore size to thereby give a coating solution B for low refractive index layer.

(Preparation of Coating Solution C for Low Refractive Index Layer)

To 5.6 g of the perfluoroolefin copolymer (A) were added 1.4 g of DPHA (manufactured by NIPPON KAYAKU Co., Ltd.), 20.0 g of hollow silica (hollow silica CS60-IPA (manufactured by CATALYSTS AND CHEMICALS IND. Co., Ltd.) surface modified with KBM-5103 (surface modification ratio 30% by mass based on silica), 0.3 g of reactive silicone X-22-164B® (manufactured by SHIN-ETSU CHEMICAL Co.), 6.2 g of the sol solution a, 0.28 g of the graft polymer (P-11), 0.2 g of a photopolymerization initiator (Irgacure 907® manufactured by Ciba Geigy), 290.6 g of methyl ethyl ketone and 9.0 g of cyclohexanone. After stirring, the obtained mixture was filtered through a polypropylene filter of 5 μm in pore size to thereby give a coating solution C for low refractive index layer.

(Preparation of Coating Solution D for Low Refractive Index Layer)

To 5.6 g of the perfluoroolefin copolymer (B) were added 1.4 g of DPHA (manufactured by NIPPON KAYAKU Co., Ltd.), 20.0 g of hollow silica (hollow silica CS60-IPA (manufactured by CATALYSTS AND CHEMICALS IND. Co., Ltd.) surface modified with KBM-5103 (surface modification ratio 30% by mass based on silica), 0.3 g of reactive silicone X-22-164B® (manufactured by SHIN-ETSU CHEMICAL Co.), 6.2 g of the sol solution b, 0.28 g of the graft polymer (P-21), 0.4 g of a photopolymerization initiator (UVI6990® manufactured by Nippon Unicar Co., Ltd.), 290.6 g of methyl ethyl ketone and 9.0 g of cyclohexanone. After stirring, the obtained mixture was filtered through a polypropylene filter of 5 μm in pore size to thereby give a coating solution D for low refractive index layer.

(Preparation of Coating Solution E for Low Refractive Index Layer)

A coating solution E for low refractive index layer was prepared as in the coating solution C as described above (including the contents) but adding 0.38 g of the graft polymer (P-8) and 0.38 g of (P-40) as substitutes for the graft polymer (P-11) in the coating solution A for low refractive index layer.

(Preparation of Coating Solution F for Low Refractive Index Layer)

A coating solution F for low refractive index layer was prepared as in the coating solution C as described above (including the contents) but adding 0.76 g of the graft polymer (R-1) having the following structure as a substitute for the graft polymer (P-11) in the coating solution A for low refractive index layer.

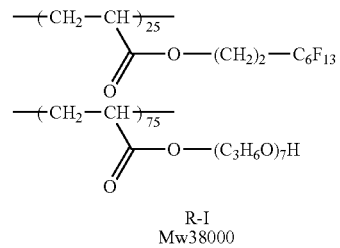

R-I
Mw38000

(Preparation of Coating Solution G for Low Refractive Index Layer)

A coating solution G for low refractive index layer was prepared in accordance with the method of EXAMPLE 1 by using a copolymer A1 (hereinafter referred to as R-2) described in JP-A-11-228631.

Example 1

Anti reflective film samples (samples 101 to 107) were obtained by applying the hard coat layer, the antiglare hard coat layer and the low refractive index layers A to H in combinations as shown below. The layers were laminated as listed in TABLE 1.

(1) Formation of Hard Coat Layer

A triacetylcellulose film of 80 μm in thickness (FUJITAC TAC-TD80U, manufactured by FUJI PHOTOFILM Co., Ltd.) was unwound in a rolled state. Then the coating solution of for hard coat layer as described above was applied by using a microgravure roll (diameter: 50 mm) having a gravure pattern of a line density of 180 lines/in. and a depth of 40 μm and a doctor blade at a gravure roll rotation speed of 30 rpm and a conveying speed of 10 m/min. After drying at 120° C. for 2 minutes, the coating layer was hardened by irradiating under nitrogen-purge (oxygen concentration 0.1% or less) with ultraviolet light at 300 mJ/cm² by using an air-cool metal halide lamp (160 W/cm, manufactured by EYEGRAPHICS Co., Ltd.) at an illuminance of 400 mW/cm². Thus a hard coat layer of 2.5 μm in thickness was formed followed by winding.

(2) Formation of Antiglare Hard Coat Layer

The triacetylcellulose film having the hard coat layer thus formed was unwound again. Then the coating solution for antiglare hard coat layer as described above was applied by using a microgravure roll (diameter: 50 mm) having a gravure pattern of a line density of 180 lines/in. and a depth of 40 μm and a doctor blade at a gravure roll rotation speed of 30 rpm and a conveying speed of 5 m/min. After drying at 120° C. for 4 minutes, the coating layer was hardened by irradiating under nitrogen-purge with ultraviolet light at 300 mJ/cm² by using an air-cool metal halide lamp (160 W/cm, manufactured by EYEGRAPHICS Co., Ltd.) at an illuminance of 400 mW/cm2. Thus a hard coat layer of 1.5 to 4.5 µm in thickness was formed followed by winding.

(2) Formation of Low Refractive Index Layer

The triacetylcellulose film having the hard coat layer and the antiglare hard coat layer thus formed was unwound again. Then the coating solution for low refractive index layer as described above was applied by using a microgravure roll (diameter: 50 mm) having a gravure pattern of a line density of 180 lines/in. and a depth of 40 µm and a doctor blade at a gravure roll rotation speed of 30 rpm and a conveying speed of 10 m/min. After drying at 80° C. for 2 minutes, the coating layer was hardened by irradiating under nitrogen-purge with ultraviolet light at 600 mJ/cm² by using an air-cool metal halide lamp (240 W/cm, manufactured by EYEGRAPHICS Co., Ltd.) at an illuminance of 400 mW/cm². After drying at 120° C. for 2.5 minutes and then at 140° C. for 8 to 20 minutes, a low refractive index layer of 0.096 µm in thickness was formed followed by winding. In the sample 107, a low refractive index layer was formed by the method described in EXAMPLE 1 in JP-A-11-228631.

TABLE 1

| Sample no. | | Coating solution for hard coat layer | Coating solution for antiglare hard coat layer | Coating solution for low refractive index layer | Graft polymer |
|---|---|---|---|---|---|
| 101 | Invention | No | Yes | A | P-8 |
| 102 | Invention | No | Yes | B | P-1 |
| 103 | Invention | No | Yes | C | P-11 |
| 104 | Invention | Yes | Yes | D | P-21 |
| 105 | Invention | Yes | Yes | E | P-40, P-8 |
| 106 | Comparison | Yes | Yes | F | R-1 |
| 107 | Comparison | Yes | Yes | G | R-2 |

(Evaluation of Antireflective Film)

The obtained films were evaluated in the following items.

(1) Average Refractive Index

The spectral reflectance at an incidence angle 5° was measured with the use of a spectrophotometer (manufactured by JASCO CO.) in a wavelength range of 380 to 780 nm. The results are expressed in the integrating sphere average reflectance at 450 to 650 nm.

(2) Haze

The haze value of each film thus obtained was measured with a haze meter MODEL 1001DP® (manufactured by NIPPON DENSHOKU).

(3) Pencil Hardness Evaluation

Pencil hardness was evaluated as an indication of scratch resistance in accordance with JIS K 5400. An antireflective film was conditioned at a temperature of 25° C. under a humidity of 60% RH for 2 hours and then tested with the use of a 3H test pencil as defined in JIS S 6006 under a load of 1 kg.

Showing no mark in n=5 evaluation :A
Showing one or two marks in n=5 evaluation :B
Showing three or more marks in n=5 evaluation :C (4) Measurement of Coefficient of Dynamic Friction Coefficient of dynamic friction was measured as an indication of surface slipperiness. As the coefficient of dynamic friction, use was made of a value determined by conditioning a sample at a temperature of 25° C. under a humidity of 60% RH for 2 hours and testing with a dynamic friction meter HEIDON-14® by using a stainless steel ball (5 mm) under a load of 100 g and a speed of 60 cm/min.

(5) Steel Wool Scratch Resistance Evaluation

By using a rubbing tester, a rubbing test was carried out under the following conditions.

Conditioning conditions: 25° C., 60% RH, 2 hours or longer.

Rubbing material: Steel wool "No.000" (manufactured by NIHON STEEL WOOL K.K.) was wound around the edge (1 cm×1 cm) of a tester being in contact with a sample and fixed with a band.

Rubbing distance (one way): 13 cm.
Rubbing speed: 13 cm/sec.
Load: 200 g/cm².
Contact area at edge: 1 cm×1 cm.
Rubbing number: 20 reciprocations.

After the completion of the rubbing, the back face of the sample was painted with a black oily ink and observed with the naked eye under reflected light. Then scratch marks in the rubbed part were evaluated in accordance with the following criteria.

No visible mark even in very careful observation :A
Slight visible marks in very careful observation :B
Slight visible marks :C
Moderate visible marks :D
Marks found at first sight :E (6) Water Cotton Swab Resistance Evaluation A cotton swab was fixed to the rubbing head of a rubbing tester. In a flat dish, a sample was fixed by clipping at the top and the bottom. Then the sample and the cotton swab were dipped in water at 25° C. at a room temperature of 25° C. Under applying a 500 g load on the cotton swab, rubbing was reciprocally repeated different times. Rubbing conditions are as follows.

Rubbing distance (one way): 1 cm.
Rubbing speed: about two reciprocations per sec.

After rubbing, the sample was examined with the naked eye and the rubbing resistance was evaluated based on the rubbing number at which the layer peeled off, as follows.

Layer peeling after 0 to 10 reciprocations :E
Layer peeling after 10 to 30 reciprocations :D
Layer peeling after 30 to 50 reciprocations :C
Layer peeling after 50 to 100 reciprocations :B
No layer peeling after 100 reciprocations :A (7) Face Figure Irregularities Coated face was observed under an optical microscope and the frequency of facial failures such as repellency was evaluated as follows.

No facial failure :A
Few facial failures :B
Noteworthy failures :C

As the results of the evaluation of facial failures of the samples, repellency and so on were less noteworthy in samples containing graft polymers in the low refractive index layer, though the comparative sample 106 with the use of the fluorine-containing copolymer R-1 showed no effect of lessening repellency. Although the comparative sample 107 with the use of R-2 showed an effect of lessening repellency, it also showed lowerings in the steel wool-rubbing resistance and the cotton swab-rubbing resistance.

The graft polymers according to the invention showed little lowerings in the steel wool-rubbing resistance and the cotton swab-rubbing resistance. It is therefore obvious that the addition of the graft polymers contributes to the achievement of both of facial figure uniformity and scratch resistance.

TABLE 2

| Sample no. | | Facial figure irregularities | Average reflectivity (%) | Haze (%) | Pencil strength | coefficient of dynamic friction | Steel wool-rubbing resistance | Cotton swab-rubbing resistance |
|---|---|---|---|---|---|---|---|---|
| 101 | Invention | A | 2.2 | 15.5 | A | 0.08 | B | A |
| 102 | Invention | A | 2.2 | 14.2 | A | 0.08 | B | A |
| 103 | Invention | A | 2.3 | 15.5 | A | 0.08 | A | A |
| 104 | Invention | A | 2.2 | 15.5 | A | 0.08 | A | A |
| 105 | Invention | A | 2.3 | 14.5 | A | 0.08 | B | A |
| 106 | Comparison | C | 2.8 | 14.2 | A | 0.08 | B | A |
| 107 | Comparison | A | 2.9 | 14.5 | A | 0.08 | D | C |

Next, antiglare/antireflective polarizing plates were constructed by using the film samples 101 to 105 according to the invention each as a protective film in the polarizing layer of the polarizing plate. When liquid crystal display units having the polarizing plate as the antireflective film serving the outermost layer were constructed, each unit showed a high contrast with no reflection of outside light and an excellent visibility with unnoticeable image reflection owing to the antiglare properties.

Further, the above-described samples according to the invention were combined with a polarizing plate made up of an optically compensatory film comprising a polarizer, a transparent substrate and an optically anisotropic layer having fixed discotic liquid crystal alignment and a light-scattering layer to thereby give liquid crystal display units and the visibilities were evaluated. As a result, each liquid crystal display unit showed a high contrast with no reflection of outside light and an excellent performance with unnoticeable image reflection owing to the antiglare properties. Each of the above samples could be produced by the wire bar coating method or the extrusion coating method as described in EXAMPLES of JP-A-9-73081 and the films thus obtained were comparable in performance to the films produced by the microgravure method as described above.

(Saponification of Antireflective Film)

The above-described samples 101 to 105 were subjected to the following treatment.

A 1.5 mol/L aqueous sodium hydroxide solution was prepared and stored at 50° C. Further, a 0.005 mol/L aqueous sulfuric acid solution was prepared.

After dipping in the 1.5 mol/L aqueous sodium hydroxide solution for 2 minutes, a sample was neutralized by further dipping in water and the aqueous sodium hydroxide solution was thoroughly washed away. Next, the sample was dipped in the aqueous sulfuric acid solution for 1 minute and the aqueous sulfuric acid solution was thoroughly washed away. Then the antireflective film was sufficiently dried at 100° C.

The antireflective films having been thus saponified were subjected to the following evaluation.

(11) Evaluation of Layer Peeling in Saponification

Layer peeling in the course of the saponification treatment was evaluated. 100 antireflective film sheets were saponified and layer peeling was observed with the naked eye before and after the saponification treatment. Evaluation was made in the following three grades.

Peeling in none of 100 sheets :A
Peeling in not more than 5 sheets :B
Peeling in more than 5 sheets :C

(12) Cross Cut Evaluation of Adhesiveness

A protective film for polarizing plate (antireflective film) was conditioned at a temperature of 25° C. under a humidity of 60% for 2 hours. 11 notches were lengthwise and crosswise made at intervals of 1 mm on the surface of the protective film for polarizing plate in the side having the outermost layer. By using a polyester adhesive tape No. 31B (manufactured by NITTO DENKO), an adhesiveness test was carried out thrice at a single site. Layer peeling was observed with the naked eye and evaluated in the following three grades.

No peeling in 100 squares :A
Peeling in not more than 2 squares :B
Peeling in more than 2 squares :C Each of the samples according to the invention was evaluated as "A" in the layer peeling during the saponification and, similarly, evaluated as "A" in the cross cut evaluation of adhesiveness. Namely, no peeling was observed in both tests.

Further, the contact angles to water in the side opposite to the antiglare hard coat layer and the low refractive index layer, having the substrate between them, of the samples according to the invention were measured. As a result, the contact angle fell within the range of from 40° to 30° in each case.

Example 2

The saponified films of the samples 101 to 105 according to the invention in EXAMPLE 1 were bonded to a polarizing plate having an absorption axis inclining by 45°, which was constructed by the method described in EXAMPLE 1 in JP-A-2002-86554, to give polarizing plates having the antiglare/antireflective film. Using these polarizing plates, liquid crystal display units having the low refractive index layer of the antireflective layer as the outermost layer were constructed. As a result, each unit showed a high contrast with no reflection of outside light and an excellent visibility with unnoticeable image reflection owing to the antiglare properties.

Example 3

By using the saponified films of the samples 101 to 105 according to the invention in EXAMPLE 1 each as substitutes for "FUJITAC TAC-TD8OU (cellulose triacetate), manufactured by FUJI PHOTOFILM Co., LTD." in EXAMPLE of JP-A-2002-86554 for constructing a polarizing plate having an absorption axis inclining by 45°, polarizing plates having the antiglare/antireflective films were constructed. Using these polarizing plates, liquid crystal display units having the low refractive index layer of the antireflective layer as the outermost layer were constructed. As a result, each unit showed a high contrast with no reflection of outside light and an excellent visibility with unnoticeable image reflection owing to the antiglare properties.

Example 4

The antireflective film samples 101 to 105 constructed in EXAMPLE 1 were dipped in a 1.5 mol/L aqueous NaOH solution at 55° C. for 2 minutes and then neutralized and washed with water. Thus, the triacetylcellulose face serving as the back face was saponified. Polarizing plates were constructed by bonding the saponified triacetylcellulose face of the antireflective film samples as described above to one face of a polarizer, which had been constructed by allowing polyvinyl alcohol to adsorb iodine and stretching, and further bonding a separately saponified triacetylcellulose film (TAC-TD80U, manufactured by FUJI PHOTOFILM CO., LTD.) to the other face. The polarizing plate in the visible side of a liquid crystal display unit (provided with a polarizing separation film having a polarizing selection layer "D-BEF" manufactured by SUMITOMO 3M Ltd. between a backlight and a liquid crystal cell) of a notebook-size personal computer having a transmission type TN liquid crystal display unit was replaced by the polarizing plates constructed above so that the antireflective film side was located as the outermost face. As a result, a high-definition display unit suffering from little reflection of outside light or background could be obtained in each case.

Example 5

As a protective film in the liquid crystal cell side of a polarizing plate in the visible side of transmission TN mode liquid crystal cells, which had the antireflective film samples 101 to 105 constructed in EXAMPLE 1 bonded so that the low refractive index layer served as the outermost layer, and as a protective film in the liquid crystal cell of the polarizing plate in the backlight side, use was made of a viewing angle-enlarging film (WIDE VIEW FILM SA-12B®, manufactured by FUJI PHOTOFILM CO., LTD.) in which the disc face of a discotic structural unit inclined to the transparent substrate face and which had an optically compensatory layer with an angle between the disc face of a discotic structural unit and the transparent substrate face changing in the depth direction of the optically compensatory layer. As a result, a liquid crystal display unit showing a high contrast in a bright room, had very broad viewing angle from side to side and up and down, a highly favorable visibility and excellent image qualities could be obtained in each case.

Example 6

The antireflective film samples 101 to 105 constructed in EXAMPLE 1 were bonded to the glass surface of organic EL display units with the use of a pressure sensitive adhesive so that the low refractive index layer served as the outermost layer. As a result, a display unit showing regulated reflection on the glass surface and high visibility could be obtained in each case.

Example 7

Using the antireflective film samples 101 to 105 constructed in EXAMPLE 1, polarizing plates having the antireflective films in one side were constructed so that the low refractive index layer served as the outermost layer. λ/4 sheets were bonded to the face of the polarizing plates opposite to the antireflective films. Then the obtained polarizing plates were bonded to the surface glass plates of organic EL display units so that the low refractive index layer served as the outermost layer. As a result, reflection from the inside of the surface glass was regulated and highly visible indication could be obtained.

This application is based on Japanese Patent application JP 2004-46625, filed Feb. 23, 2004, the entire content of which is hereby incorporated by reference, the same as if set forth at length.

What is claimed is:

1. An antireflective layer comprising a plurality of functional layers having different refractive indexes, the plurality of functional layers including a low refractive index layer containing a fluorine-containing copolymer, wherein the low refractive index layer further contains a polymer represented by the following formula [5]:

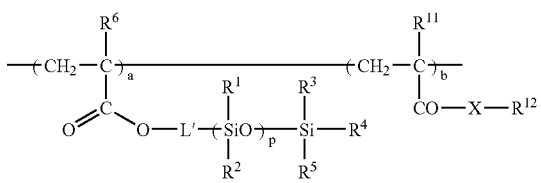

[5]

wherein $R^1$ and $R^2$ may be same or different and each represents a hydrogen atom, an alkyl group or an aryl group; p is an integer of from 10 to 500; $R^3$, $R^4$ and $R^5$ may be same or different and each represents a hydrogen atom or a monovalent organic group; $R^6$ represents a hydrogen atom or a methyl group; L' represents an alkylene group having from 1 to 25 carbon atoms or an arylene group having from 1 to 25 carbon atoms; $R^{11}$ represents a hydrogen atom or a methyl group; X represents an oxygen atom, a sulfur atom or $-N(R^{13})-$; $R^{12}$ is a linear, branched, alicyclic, or aromatic hydrocarbon that may optionally contain at least one substituent selected from the group consisting of a chlorine atom, an amine group, a carboxylic acid group, an alkyloxy group, a nitro group, a hydroxyl group, an alkyl ester group, and a nitrile group; $R^{13}$ represents a hydrogen atom or an alkyl group having from 1 to 8 carbon atoms; and a and b represent mass fractions (%) of respective components, provided that $0.01 \leq a \leq 100$ and $0 \leq b \leq 95$, and $a+b=100$.

2. The antireflective layer according to claim 1, wherein the low refractive index layer further contains an inorganic filler.

3. The antireflective layer according to claim 1, wherein the plurality of functional layers includes a hard coat layer containing a binder and an inorganic filler.

4. The antireflective layer according to claim 1, wherein the plurality of functional layers includes an antiglare hard coat layer comprising a binder, matting particles and an inorganic filler.

5. An antireflective film comprising the antireflective layer according to claim 1 and a transparent substrate.

6. An image display unit comprising the antireflective film according to claim 5.

* * * * *